United States Patent
Khan

(10) Patent No.: US 12,056,292 B2
(45) Date of Patent: Aug. 6, 2024

(54) WEARABLE APPARATUS AND CONTROL METHOD THEREOF

(71) Applicant: SAMSUNG ELECTRONICS CO., LTD., Suwon-si (KR)

(72) Inventor: Md. Sazzad Hissain Khan, Dacca (BD)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/109,084

(22) Filed: Feb. 13, 2023

(65) Prior Publication Data

US 2023/0205325 A1 Jun. 29, 2023

Related U.S. Application Data

(63) Continuation of application No. PCT/KR2022/016987, filed on Nov. 1, 2022.

(30) Foreign Application Priority Data

Dec. 23, 2021 (KR) .................. 10-2021-0186525

(51) Int. Cl.
*G06F 3/0346* (2013.01)
*G06F 3/01* (2006.01)

(52) U.S. Cl.
CPC ............ *G06F 3/0346* (2013.01); *G06F 3/011* (2013.01); *G06F 3/017* (2013.01)

(58) Field of Classification Search
CPC .......... G06F 1/163; G06F 3/011; G06F 3/017; G06F 3/0346; G06F 3/038; G06F 3/0484;
(Continued)

(56) References Cited

U.S. PATENT DOCUMENTS

| 8,098,141 B2 | 1/2012 | Vanska et al. |
| 9,898,120 B2 | 2/2018 | Rhee et al. |

(Continued)

FOREIGN PATENT DOCUMENTS

| KR | 1020150061420 A | 6/2015 |
| KR | 1020160093499 A | 8/2016 |

(Continued)

OTHER PUBLICATIONS

Raj, A., "Are smartwatches the future of wearable devices?", Jul. 1, 2021, 4 pages. [https://techwireasia.com/2021/07/are-smartwatches-the-future-of-wearable-devices].

(Continued)

*Primary Examiner* — Nelson M Rosario
(74) *Attorney, Agent, or Firm* — Sughrue Mion, PLLC

(57) ABSTRACT

A wearable apparatus, including a display; a strap arranged adjacent to the display; at least one sensor configured to acquire posture information of the wearable apparatus; and at least one processor connected with the display and the at least one sensor and configured to control the wearable apparatus, wherein the at least one processor may be further configured to: control the display to provide a user interface (UI) screen, based on identifying that a change in the posture information is greater than or equal to a threshold range, identify that a tap input of a user was received on the strap, and acquire a control command corresponding to the UI screen based on the changed posture information, and control the wearable apparatus based on the control command.

20 Claims, 23 Drawing Sheets

(58) Field of Classification Search
CPC .............. G06F 3/04883; G06F 3/167; G06F 2200/1636
See application file for complete search history.

(56) References Cited

U.S. PATENT DOCUMENTS

| | | | |
|---|---|---|---|
| 10,162,512 | B2 | 12/2018 | Seo et al. |
| 10,866,637 | B2 | 12/2020 | Bae et al. |
| 10,928,918 | B2 | 2/2021 | Lemay et al. |
| 11,068,025 | B2 | 7/2021 | Chen et al. |
| 11,360,558 | B2* | 6/2022 | Wang ............... G06T 19/006 |
| 2011/0134074 | A1* | 6/2011 | Norieda ............. G06F 1/163 345/173 |
| 2015/0338979 | A1 | 11/2015 | Rhee et al. |
| 2016/0026308 | A1 | 1/2016 | Wu et al. |
| 2016/0127624 | A1 | 5/2016 | Woo et al. |
| 2017/0123487 | A1* | 5/2017 | Hazra ............... G06F 3/04845 |
| 2017/0220923 | A1 | 8/2017 | Bae et al. |
| 2018/0113486 | A1 | 4/2018 | Chen et al. |
| 2020/0372246 | A1* | 11/2020 | Chidananda ......... G06V 10/764 |
| 2021/0010797 | A1 | 1/2021 | Cihan et al. |
| 2021/0117078 | A1 | 4/2021 | Yang et al. |

FOREIGN PATENT DOCUMENTS

| | | |
|---|---|---|
| KR | 10-2016-0149489 A | 12/2016 |
| KR | 10-2017-0019456 A | 2/2017 |
| KR | 10-2017-0091963 A | 8/2017 |
| KR | 10-2151136 B1 | 9/2020 |
| KR | 102160767 B1 | 9/2020 |
| KR | 10-2204553 B1 | 1/2021 |
| KR | 10-2288823 B1 | 8/2021 |
| WO | 2016/010857 A1 | 1/2016 |

OTHER PUBLICATIONS

Stables, J., "Samsung patents smartwatch keyboard that projects onto your hand", May 16, 2016, 2 pages. [https://www.wareable.com/samsung/samsung-patents-smartwatch-keyboard-that-projects-onto-your-hand-2717].

"Apple's 'Back Tap' Patent also explores using new Voice Recognition Technology to control a Future TV by Apple & more", Jan. 2021, 12 pages.[https://www.patentlyapple.com/patently-apple/2021/01/apples-back-tap-patent-also-explores-using-new-voice-recognition-technology-to-control-a-future-tv-by-apple-more.html].

Tahir, A., et al., "HRNN4F: hybrid deep random neural network for multi-channel fall activity detection", 2021, 18 pages. [https://researchonline.gcu.ac.uk/ws/portalfiles/portal/32604362/Paper_HRNN4F.pdf].

"How can a screen sense touch? A basic understanding of touch panels", Sep. 27, 2010, 7 pages. [https://www.eizoglobal.com/library/basics/basic_understanding_of_touch_panel/].

Laput, G., et al., "ViBand: High-Fidelity Bio-Acoustic Sensing Using Commodity Smartwatch Accelerometers", (2016) pp. 321-333, 13 pages. [https://chrisharrison.net/projects/viband/viband.pdf].

"Huawei gesture smartwatch", TECH2 News Staff, LetsGoDigital, Feb. 3, 2018, 1 page.

"Common Smartwatch Problems and Fixes", Fixit Mobile, Jun. 19, 2020), 1 page. [https://fixitmobile.com/blog/common-smartwatch-problems-and-fixes/].

Chen, W., et al., "A Wearable Tactile Sensor Based on Electrical-Contact-Resistance (ECR) Variation With High Sensitivity for Health Monitoring", 2017, pp. 1116-1119, 4 pages.

Ren, W., "Electrical Contact Resistance of Connector Response to Mechanical Vibration Environment", IEEE Transactions on Components, Packaging and Manufacturing Technology, vol. 10, No. 2, Feb. 2020, pp. 212-219, 8 pages.

Chen, J., "Fat Finger Error", Trading Skills, Trading Basic Education, (Apr. 26, 2011), 6 pages. [https://www.investopedia.com/terms/f/fat-finger-error.asp].

"What is the Water Lock mode on Samsung Galaxy Watch?", Oct. 1, 2018, 2 pages. [https://www.samsung.com/sg/support/mobile-devices/what-is-the-water-lockmode-on-samsung-galaxy-watch/].

Written Opinion (PCT/ISA/237) issued Feb. 14, 2023 by the International Searching Authority in International Application No. PCT/KR2022/016897.

International Search Report (PCT/ISA/210) issued Feb. 14, 2023 by the International Searching Authority in International Application No. PCT/KR2022/016897.

* cited by examiner

WEARABLE APPARATUS AND CONTROL METHOD THEREOF

CROSS-REFERENCE TO RELATED APPLICATIONS

This application is a continuation of International Application No. PCT/KR2022/016897, filed on Nov. 1, 2022, in the Korean Intellectual Property Receiving Office, which claims priority to Korean Patent Application No. 10-2021-0186525, filed on Dec. 23, 2021, in the Korean Intellectual Property Office, the disclosures of which are incorporated by reference herein in their entireties.

BACKGROUND

1. Field

The disclosure relates to a wearable apparatus and a control method thereof, and more particularly, to a wearable apparatus that performs an operation according to a user manipulation, and a control method thereof.

2. Description of Related Art

Spurred by the development of electronic technologies, various types of electronic apparatuses are being developed. In particular, recently, wearable apparatuses which may be worn on a user, for example as clothing or an accessory such as a watch, and shoes, or which may be attached to or inserted into the skin are being developed, as connectivity and integrated circuit (IC) chips have been developed.

However, as display and body areas of a wearable apparatus are small compared to apparatuses such as a smartphone, a tablet personal computer (PC), etc., there is a problem that a user manipulation is difficult.

As a method for resolving such a problem, as illustrated in FIG. 1A, a technology of projecting a button screen on the back of a user's hand through a projector, and identifying which button was touched through a camera sensor was developed. However, in this method, there are problems that an area for projection is needed, the manufacturing cost increases for including a projector and a camera sensor, and the battery consumption increases.

As illustrated in FIG. 1B, a method of scanning a movement of a finger by projecting an ultrasonic signal or an infrared signal around a wearable apparatus was developed. However, in this method, there are disadvantages that the back of a hand should be adjusted to the height of a sensor for using as a track pad, and a feature for projecting a signal is needed.

As illustrated in FIG. 1C, a method of detecting a vibration waveform colliding with an apparatus through a self-mixing interferometry (SMI) sensor was developed. However, in this method, there is a problem that an SMI sensor for detecting a vibration waveform is needed, and thus the manufacturing cost increases.

In addition, a method of including a touch detection sensor on a strap of a wearable apparatus and controlling the wearable apparatus was developed. However, in this method, there is also a problem that a separate touch detection sensor should be included in a strap, and thus the manufacturing cost increases. Also, there is a problem that control is difficult in case a user wears gloves, or the apparatus is in a touch lock state, etc.

As described above, there is a need to develop a wearable apparatus that provides various user manipulation methods while not increasing the manufacturing cost of the wearable apparatus.

SUMMARY

Provided are a wearable apparatus that provides various manipulation methods to a user while the manufacturing cost does not increase, and a control method thereof.

According to an aspect of the disclosure, a wearable apparatus includes a display; a strap arranged adjacent to the display; at least one sensor configured to acquire posture information of the wearable apparatus; and at least one processor connected with the display and the at least one sensor and configured to control the wearable apparatus, wherein the at least one processor may be further configured to: control the display to provide a user interface (UI) screen, based on identifying that a change in the posture information is greater than or equal to a threshold range, identify that a tap input of a user was received on the strap, and acquire a control command corresponding to the UI screen based on the changed posture information, and control the wearable apparatus based on the control command.

The at least one sensor may include: a gyro sensor configured to obtain angular velocity information, an acceleration sensor configured to obtain acceleration information, and a magnetometer sensor configured to obtain magnetometer information, and based on first change information about the angular velocity information being greater than or equal to a first threshold value, second change information about the acceleration information being greater than or equal to a second threshold value, and third change information about the magnetometer information being greater than or equal to a third threshold value, the at least one processor may be further configured to acquire the control command based on the first change information, the second change information, and the third change information.

The at least one processor may be further configured to acquire the control command based on: the angular velocity information during a first threshold time before the tap input is received being within a first threshold range, the acceleration information during the first threshold time being within a second threshold range, and the magnetometer information during the first threshold time being within a third threshold range.

The at least one processor may be further configured to acquire the control command based on identifying that: the angular velocity information during a first threshold time is within a first threshold range, the acceleration information during the first threshold time is within a second threshold range, the magnetometer information during the first threshold time is within a third threshold range, during a second threshold time after the first threshold time, the acceleration information increases from less than or equal to a first value to greater than or equal to a second value greater than the first value, and then becomes less than or equal to the first value, and the tap input was received within a third threshold time after the second threshold time.

The at least one sensor may include an acceleration sensor configured to acquire acceleration information, and based on the acceleration information increasing from less than or equal to a first value to greater than or equal to a second value greater than the first value during a second threshold time before the tap input is received, and then becoming less than or equal to the first value, and second change information about the acceleration information corresponding to the tap input being greater than or equal to a second threshold value, the at least one processor may be further configured to acquire the control command based on the acceleration information.

The at least one processor may be further configured to acquire the control command based on identifying that the posture information is changed by greater than or equal to the threshold range while the wearable apparatus is released from a lock state.

The at least one processor may be further configured to acquire the control command based on no user manipulation being detected at the display while the tap input is received.

The at least one processor may be further configured to acquire the control command based on the wearable apparatus being worn on the user and a predetermined application being executed.

The wearable apparatus may further include a memory configured to store a neural network model, and the at least one processor may be further configured to input the changed posture information into the neural network model and identify whether the tap input is an input for controlling the wearable apparatus.

The at least one sensor may include a sound sensor, and the at least one processor may be further configured to: acquire sound information corresponding to the tap input through the sound sensor, and acquire the control command based on at least one of the changed posture information and the sound information.

The wearable may further include a main body, wherein the display, the at least one sensor, and the at least one processor are included in the main body, and wherein the strap is connected to the main body.

According to an aspect of the disclosure, a control method of a wearable apparatus includes providing a user interface (UI) screen; based on identifying that a change in posture information of the wearable apparatus is greater than or equal to a threshold range, identifying that a tap input of a user was received on the strap of the wearable apparatus; acquiring a control command corresponding to the UI screen based on the changed posture information; and controlling the wearable apparatus based on the control command.

The posture information may include angular velocity information, acceleration information, and magnetometer information, and the acquiring may include, based on first change information about the angular velocity information being greater than or equal to a first threshold value, second change information about the acceleration information being greater than or equal to a second threshold value, and third change information about the magnetometer information being greater than or equal to a third threshold value, acquiring the control command based on the first change information, the second change information, and the third change information.

The control command may be acquired based on the angular velocity information during a first threshold time before the tap input is received being within a first threshold range, the acceleration information during the first threshold time being within a second threshold range, and the magnetometer information during the first threshold time being within a third threshold range.

The control command may be acquired based on identifying that: the angular velocity information during a first threshold time is within a first threshold range, the acceleration information during the first threshold time is within a second threshold range, the magnetometer information during the first threshold time is within a third threshold range, during a second threshold time which is right after the first threshold time, the acceleration information increases from less than or equal to a first value to greater than or equal to a second value greater than the first value, and then becomes less than or equal to the first value, and the tap input was received within a third threshold time after the second threshold time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
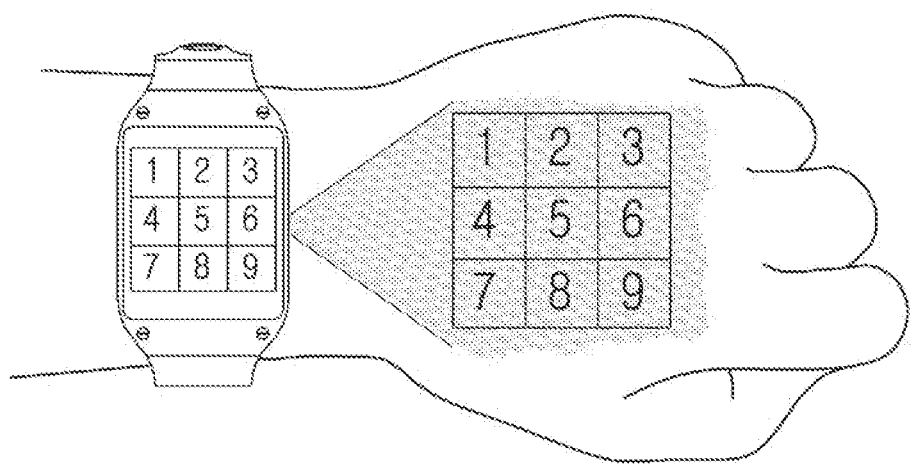
FIGS. 1A, 1B, and 1C are diagrams for describing related art technology.
Figure 1B:
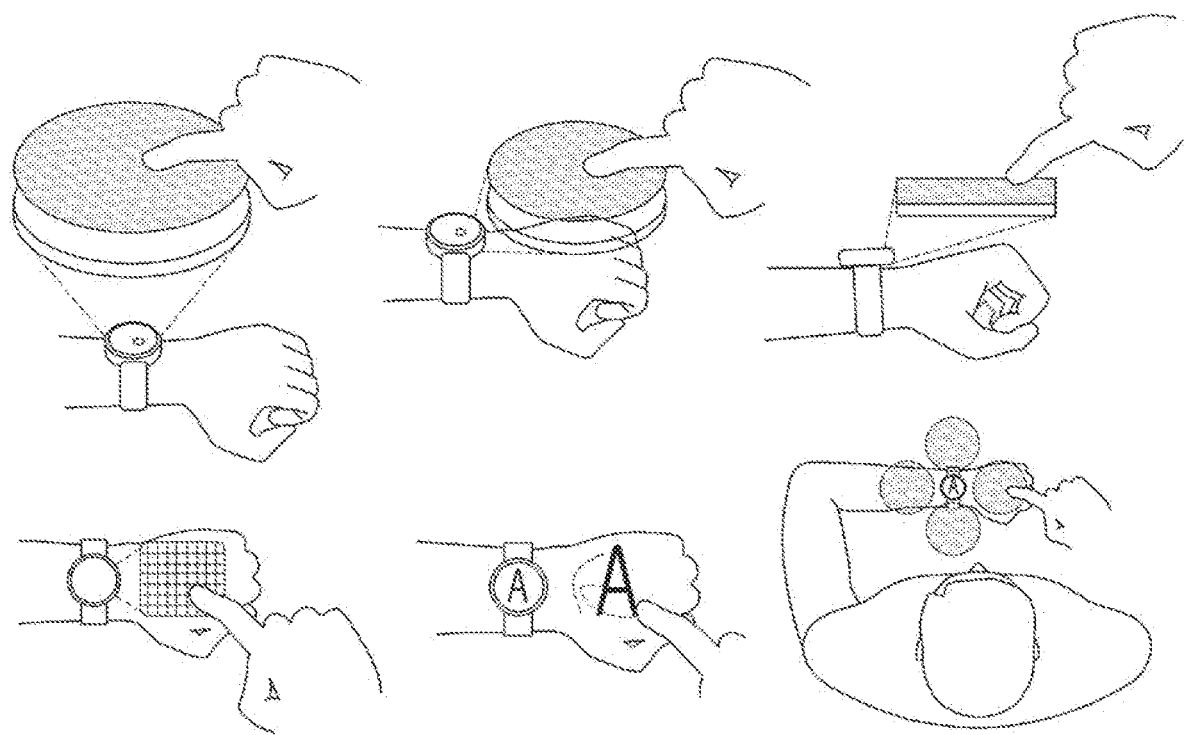
Figure 1C:
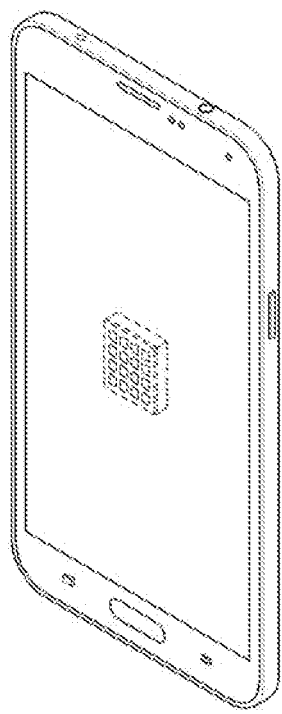

Embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, embodiments will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there may be terms that were arbitrarily chosen, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In addition, expressions such as "have," "may have," "include," and "may include" denote the existence of such characteristics (e.g.: elements such as numbers, functions, operations, and components), and do not exclude the existence of additional characteristics.

Further, the expression "at least one of A and/or B" should be interpreted to mean any one of "A" or "B" or "A and B."

Also, the expressions "first," "second," and the like used in this specification may describe various elements regardless of any order and/or degree of importance. In addition, such expressions are used only to distinguish one element from another element, and are not intended to limit the elements.

Further, singular expressions include plural expressions, unless defined obviously differently in the context. Also, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

In addition, the term "user" may refer to a person who uses an electronic apparatus or an apparatus using an electronic apparatus (e.g.: an artificial intelligence electronic apparatus).

Hereinafter, various embodiments of the disclosure will be described in more detail with reference to the accompanying drawings.

Figure 2:
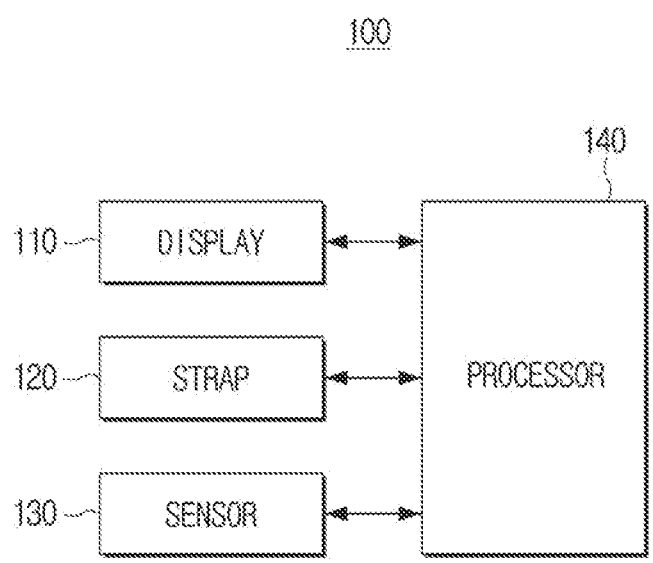
FIG. 2 is a block diagram illustrating a configuration of a wearable apparatus according to an embodiment.

FIG. 2 is a block diagram illustrating a configuration of a wearable apparatus 100 according to an embodiment of the disclosure. As illustrated in FIG. 2, the wearable apparatus 100 may include a display 110, a strap 120, a sensor 130, and a processor 140.

The wearable apparatus 100 may be an apparatus which may be worn on a user, or may be attached to or inserted into the skin, and may be a smart watch, a smart band, smart glasses, a smart ring, a head mounted display (HMD), etc. However, the wearable apparatus 100 is not limited thereto, and embodiments may include any apparatus implemented in a form suitable for being worn on a user, or in a form suitable for being attached to or inserted into the skin.

The display 110 may be implemented as displays in various forms such as a liquid crystal display (LCD), an organic light emitting diodes (OLED) display, a plasma display panel (PDP), etc. Inside the display 110, driving circuits that may be implemented in forms such as an a-si TFT, a low temperature poly silicon (LTPS) TFT, an organic TFT (OTFT), etc., a backlight unit, etc. may also be included. In embodiments, the display 110 may be implemented as a touch screen combined with a touch sensor, a flexible display, a 3D display, etc.

The strap 120 may be arranged to be adjacent to the display 110, and may be implemented in a form suitable for being worn on a user. For example, the strap 120 may be connected to a main body including the display 110, the sensor 130, and the processor 140. The strap 120 may also be referred to as a similar word such as a band, a belt, etc. However, the term strap 120 will be used below, for the convenience of explanation.

The sensor 130 may be a component for acquiring posture information of the wearable apparatus 100, and may include at least one of a gyro sensor, an acceleration sensor, or a magnetometer sensor. In embodiments, the sensor 130 may further include a sound sensor.

The gyro sensor may be a sensor for detecting a rotation angle of the wearable apparatus 100, and it may measure change of a direction of an object using the property of always maintaining a specific direction that was initially set with high precision regardless of the rotation of the earth. The gyro sensor may also be referred to as a gyroscope, and may be implemented by a mechanical method or an optical method using light.

The gyro sensor may measure angular velocity. Angular velocity may refer an angle of rotation per time, and the principle of measurement by the gyro sensor is as follows. For example, if angular velocity in a horizontal state (a halt state) is 0°/sec, and if an object was tilted as much as 50° while it was moving for 10 seconds, the average angular velocity during 10 seconds is 5°/sec. If the tilted angle 50° was maintained in a halt state, the angular velocity becomes 0°/sec. While going through such a process, the angular velocity changed from 0→5→0, and the angle increases from 0° and becomes 50°. To acquire an angle from the angular velocity, an integration may be performed for the entire time. As the gyro sensor measures the angular velocity as above, if this angular velocity is integrated during the entire time, the tilted angle can be calculated. However, in the gyro sensor, errors may occur due to the influence of the temperature, and errors may accumulate during an integration process, and the final value may be drifted. Accordingly, the wearable apparatus 100 may further include a temperature sensor, and compensate an error of the gyro sensor using the temperature sensor.

The acceleration sensor may be a sensor that measures acceleration or the strength of impact of the wearable apparatus 100, and may also be referred to as an accelerometer. The acceleration sensor may detect dynamic force such as acceleration, vibration, impact, etc., and may be implemented in an inertial type, a gyro type, a silicon semiconductor type, etc. according to detection methods. That is, the acceleration sensor may be a sensor that senses the tilting degree of the wearable apparatus 100 using acceleration of gravity, and it may generally consist of a two-axis or three-axis fluxgate.

The magnetometer sensor may refer to a sensor that measures the strength and the direction of the earth's magnetic field, but in a broad sense, it may include a sensor that measures the strength of magnetization that an object has, and also may be referred to as a magnetometer. The magnetometer sensor may be implemented in a method of hanging a magnet horizontally in a magnetic field and measuring the direction in which the magnet moves, or rotating a coil inside a magnetic field and measuring induced electromotive force generated in the coil and thereby measuring the strength of the magnetic field.

In particular, a geomagnetic sensor measuring the strength of the earth's magnetic field, which is a type of magnetometer sensors, may generally be implemented as a fluxgate-type geomagnetic sensor that detects the earth's magnetic field using a fluxgate. A fluxgate-type geomagnetic sensor may refer to an apparatus that uses a highly permeable material such as permalloy as a magnetic core, and applies an excitation magnetic field through a driving coil wound around the magnetic core and measures a secondary harmonic component in proportion to an external magnetic field generated according to the magnetic saturation and nonlinear magnetic properties of the magnetic core, and thereby measures the size and the direction of the external magnetic field. As the size and the direction of the external magnetic field are measured, the current direction angle may be detected, and in accordance thereto, the degree of rotation can be measured. The geomagnetic sensor may consist of a two-axis or three-axis fluxgate. A two-axis fluxgate sensor may refer to a sensor which includes an X-axis fluxgate and a Y-axis fluxgate orthogonal to each other, and a three-axis fluxgate sensor may refer to a sensor wherein a Z-axis fluxgate has been added to the X-axis fluxgate and the Y-axis fluxgate.

Using the geomagnetic sensor and the acceleration sensor as above, it may be possible to acquire posture information of the wearable apparatus 100. For example, the posture information of the wearable apparatus 100 may be expressed as a pitch angle, a roll angle, and a direction angle.

A direction angle (a yaw angle) may refer to an angle that changes in left and right directions on a horizontal plane, and if a direction angle is calculated, it can be figured out to which direction the wearable apparatus 100 is toward. For example, using the geomagnetic sensor, a direction angle can be measured through Equation 1 as follows.

$$\Psi = \arctan(\sin \psi / \cos \psi) \quad \text{Equation 1}$$

Here, $\Psi$ may refer to a direction angle, and $\cos \Psi$ and $\sin \Psi$ mean X-axis and Y-axis fluxgate output values.

A roll angle may refer to an angle by which the horizontal plane is tilted in left and right directions, and if a roll angle is calculated, the left side or right side tilt of the wearable apparatus 100 can be figured out. A pitch angle may refer to an angle by which the horizontal plane is tilted in up and down directions, and if a pitch angle is calculated, the tilted angle by which the wearable apparatus 100 is tilted to the upper side or the lower side can be figured out. For example, using the acceleration sensor, a roll angle and a pitch angle can be measured using Equation 2 and Equation 3 as follows.

$$\phi = \arcsin(ay/g) \quad \text{Equation 2}$$

$$\theta = \arcsin(ax/g) \quad \text{Equation 3}$$

Here, g may refer to acceleration of gravity, $\phi$ may refer to a roll angle, $\theta$ may refer to a pitch angle, ax may refer to an X-axis acceleration sensor output value, and ay may refer to a Y-axis acceleration sensor output value.

The sound sensor may be a sensor that detects sounds, and may be a microphone, etc. Also, the sound sensor may detect ultrasonic waves.

The sensor 130 is described above as including at least one of a gyro sensor, an acceleration sensor, a magnetometer sensor, or a sound sensor, for the convenience of explanation. However, embodiments are not limited thereto, and the sensor 130 can be any sensor which may for example acquire posture information of the wearable apparatus 100.

The processor 140 may control the overall operations of the wearable apparatus 100. Specifically, the processor 140 may be connected to each component of the wearable apparatus 100, and control the overall operations of the wearable apparatus 100. For example, the processor 140 may be connected to components such as the display 110, the sensor 130, etc., and control the operations of the wearable apparatus 100.

According to an embodiment, the processor 140 may be implemented as a digital signal processor (DSP), a microprocessor, and a time controller (TCON). However, embodiments are not limited thereto, and the processor 140 may include one or more of a central processing unit (CPU), a micro controller unit (MCU), a micro processing unit (MPU), a controller, an application processor (AP), or a communication processor (CP), and an ARM processor, or may be defined by the terms. Also, the processor 140 may be implemented as a system on chip (SoC) having a processing algorithm stored therein or large scale integration (LSI), or in the form of a field programmable gate array (FPGA).

The processor 140 may control the display 110 to provide a user interface (UI) screen, and if it is identified that posture information of the wearable apparatus 100 acquired through the sensor 130 has been changed by greater than or equal to a threshold range, the processor 140 may identify that a user's tap input for the strap 120 was received. In embodiments, a user's tap input for the strap 120 may refer to a tap input of the user that is received on the strap 120.

Then, if it is identified that a user's tap input for the strap 120 was received, the processor 140 may acquire a control command corresponding to the UI screen based on the changed posture information, and control the wearable apparatus 100 based on the control command.

For example, the processor 140 may control the display 110 to display a game screen as a game application is executed. In a state wherein a game screen is displayed, if a user's tap input for the strap 120 is received, the wearable apparatus 100 may be tilted. The processor 140 may identify that the posture information of the wearable apparatus 100 has been changed by greater than or equal to a threshold range based on at least one of the gyro sensor, the acceleration sensor, or the magnetometer sensor. In this case, the processor 140 may identify that a user's tap input for the strap 120 was received.

Based on receiving a user's tap input for the strap 120, the wearable apparatus 100 may store information about how much the wearable apparatus 100 is tilted. For example, even if there is a user's tap input for the main body of the wearable apparatus 100, the processor 140 may identify that the tilting degree of the wearable apparatus 100 is different from the stored information by greater than or equal to a threshold numerical value, and may not perform any operation. In embodiments, a user's tap input for the main body may refer to a tap input of the user that is received on the main body.

Based on the changed posture information of the wearable apparatus 100 being different from the stored information by greater than or equal to a threshold range and being within a threshold numerical value, the processor 140 may identify a corresponding user's command. Here, the changed posture information may include not only posture information changed in one direction, but also posture information changed in a plurality of directions. For example, posture information being changed in a plurality of directions may include an increase of two or more acceleration values during two seconds, and then a decrease of two or more acceleration values. However, embodiments are not limited thereto, and the posture information changed in a plurality of directions may be information in any of various patterns.

In embodiments, the sensor 130 may include a gyro sensor, an acceleration sensor, and a magnetometer sensor, and if first change information of angular velocity information by the gyro sensor is greater than or equal to a first threshold value, second change information of acceleration information by the acceleration sensor is greater than or equal to a second threshold value, and third change information of magnetometer information by the magnetometer sensor is greater than or equal to a third threshold value, the processor 140 may acquire a control command based on the first change information, the second change information, and the third change information.

For example, based on the angular velocity information during a first threshold time before the tap input is received being within a first threshold range, the acceleration information during the first threshold time being within a second threshold range, and the magnetometer information during the first threshold time being within a third threshold range, the processor 140 may acquire a control command.

In embodiments, based on a user operating the wearable apparatus 100 in a halt state, and not in a state of walking or moving, during the first threshold time in a halt state, the angular velocity information, the acceleration information, and the magnetometer information may respectively show corresponding deviations, and may be set in the first threshold range to the third threshold range based on the respective corresponding deviations. For example, the first threshold range may be a value which is a sum of the deviation of the angular velocity information while a user is in a halt state and a predetermined margin. Also, the first threshold range may be a value less than the deviation of the angular velocity information while a user is in a walking state. The second threshold range and the third threshold range may also be set by a similar method. If, after the first threshold time, the first change information of the angular velocity information according to a tap input is greater than or equal to the first threshold value, the second change information of the acceleration information is greater than or equal to the second threshold value, and the third change information of the magnetometer information is greater than or equal to the third threshold value, the processor 140 may identify that a tap input was received, and acquire a control command based on the first change information, the second change information, and the third change information.

Here, the first threshold time may be right before a tap input is received. For example, if the angular velocity information during the first threshold time is within the first threshold range, the acceleration information during the first threshold time is within the second threshold range, and the magnetometer information during the first threshold time is within the third threshold range, and a tap input is received right after the first threshold time, the processor 140 may acquire a control command. In embodiments, right before and right after may mean a short time before and a short time after, respectively.

However, embodiments are not limited thereto, and there may be a predetermined time difference between the first threshold time and a time point when a tap input is received. For example, if the angular velocity information during the first threshold time is within the first threshold range, the acceleration information during the first threshold time is within the second threshold range, and the magnetometer information during the first threshold time is within the third threshold range, and a tap input is received after the first threshold time, e.g., after three to five seconds, the processor 140 may acquire a control command.

In embodiments, there may be a case wherein a predetermined control command is input between the first threshold time and a time point when a tap input is received. For example, if the angular velocity information during the first threshold time is within the first threshold range, the acceleration information during the first threshold time is within the second threshold range, and the magnetometer information during the first threshold time is within the third threshold range, and a tap input is received while a predetermined application was executed according to a user command of executing a predetermined application after the first threshold time, the processor 140 may acquire a control command.

In embodiments, if it is identified that the angular velocity information during the first threshold time is within the first threshold range, the acceleration information during the first threshold time is within the second threshold range, and the magnetometer information during the first threshold time is within the third threshold range, and the acceleration information increases from less than or equal to a first value, to greater than or equal to a second value greater than the first value, and then becomes less than or equal to the first value, and a tap input was received within a third threshold time after the second threshold time, the processor 140 may acquire a control command.

For example, based on a user being in a halt state, the angular velocity information, the acceleration information, and the magnetometer information may respectively be within corresponding deviations. Afterwards, based on the user raising his arm and viewing the wearable apparatus 100, the acceleration information may gradually increase, and then gradually decrease. Afterwards, if it is identified that a tap input was received, the processor 140 may acquire a control command.

However, embodiments are not limited thereto, and the sensor 130 may include only some of the gyro sensor, the acceleration sensor, or the magnetometer sensor. In this case, the processor 140 may perform an operation as above using only some sensors.

In embodiments, the sensor 130 may include an acceleration sensor, and if the acceleration information increases from less than or equal to the first value to greater than or equal to the second value greater than the first value, and then becomes less than or equal to the first value during the second threshold time before a tap input is received, and the second change information of the acceleration information according to the tap input is greater than or equal to the second threshold value, the processor 140 may acquire a control command based on the acceleration information.

For example, based on the user raising his arm and viewing the wearable apparatus 100, the acceleration information may gradually increase, and then gradually decrease. Afterwards, if the second change information of the acceleration information is greater than or equal to the second threshold value, the processor 140 may identify that a tap input was received, and acquire a control command based on the second change information.

Also, in this case, the processor 140 may not consider the angular velocity information and the magnetometer information, and if the acceleration information increases from less than or equal to the first value to greater than or equal to the second value greater than the first value, and then becomes less than or equal to the first value during the second threshold time before a tap input is received, and the second change information of the acceleration information according to the tap input is greater than or equal to the second threshold value, the processor 140 may acquire a control command based on the acceleration information.

In embodiments, the sensor 130 may include an acceleration sensor, and if the acceleration information by the acceleration sensor during the first threshold time before a tap input is received is within a fourth threshold range, and the acceleration information increases from less than or equal to the first value to greater than or equal to the second value greater than the first value, and then becomes less than or equal to the first value during the second threshold time before the first threshold time, and the second change information of the acceleration information according to the tap input is greater than or equal to the second threshold value, the processor 140 may acquire a control command based on the acceleration information. Here, the fourth threshold range may be greater than the aforementioned second threshold range. This is because, based on an operation of raising an arm being performed earlier, a margin may be added for detecting a tap input even though there is shaking by a walking motion.

For example, based on the user raising his arm and viewing the wearable apparatus 100, the acceleration information may gradually increase, and then gradually decrease, and may be maintained within the fourth threshold range thereafter. Afterwards, if the second change information of the acceleration information is greater than or equal to the second threshold value, the processor 140 may identify that a tap input was received, and acquire a control command based on the second change information.

Also, in this case, the processor 140 may not consider the angular velocity information and the magnetometer information, and if the acceleration information by the acceleration sensor during the first threshold time before a tap input is received is within the fourth threshold range, and the acceleration information increases from less than or equal to the first value to greater than or equal to the second value greater than the first value, and then becomes less than or equal to the first value during the second threshold time before the first threshold time, and the second change information of the acceleration information according to the tap input is greater than or equal to the second threshold value, the processor 140 may acquire a control command based on the acceleration information.

If it is identified that the posture information has been changed by greater than or equal to the threshold range in a state wherein the wearable apparatus 100 has been released from a lock state, the processor 140 may acquire a control command based on the changed posture information. For example, if it is identified that the posture information has been changed by less than the threshold range while the wearable apparatus 100 is in a lock state, the processor 140 may not perform any operation, and if it is identified that the posture information has been changed by greater than or equal to the threshold range in a state wherein the wearable apparatus 100 has been released from the lock state, the processor 140 may acquire a control command based on only the case of the changed posture information. Here, the lock state may be released by at least one of a PIN, a password, a pattern, or a biological identifier.

However, embodiments are not limited thereto, and in case the wearable apparatus 100 is in a lock state, if the posture information is changed to a predetermined type, the processor 140 may also perform an operation corresponding to the changed posture information. For example, if a plurality of tap inputs are received in predetermined beats and the wearable apparatus 100 is in a lock state, the processor 140 may release the lock state of the wearable apparatus 100 based on the changed posture information according to the plurality of tap inputs.

In embodiments, based on there being no user manipulation through the display 110 while a tap input is received, the processor 140 may acquire a control command based on the changed posture information. For example, based on a user manipulation through the display 110, the processor 140 may identify that a user inputs a control command only through the display 110, and process the posture change of the wearable apparatus 100 as information not intended by the user.

However, embodiments are not limited thereto, and the processor 140 may acquire a control command by combining a touch input through the display 110 and a tap input for the strap 120. For example, if a tap input for the strap 120 is received without a touch input through the display 110, the processor 140 may perform a first operation, and if a tap input for the strap 120 is received at the same time as a touch input through the display 110, the processor 140 may perform a second operation.

In embodiments, based on the wearable apparatus 100 being worn on a user, the processor 140 may acquire a control command based on the changed posture information. For example, the sensor 130 may include a temperature sensor, and the processor 140 may identify whether the wearable apparatus 100 is worn on a user through the temperature sensor. In embodiments, the wearable apparatus 100 may include a main body, a first strap connected to one side of the main body, and a second strap connected to another side of the main body, and the processor 140 may identify whether the wearable apparatus 100 is worn on a user based on whether the first strap and the second strap are connected. However, embodiments are not limited thereto, and the processor 140 may identify whether the wearable apparatus 100 is worn on a user in any of various methods. Also, only when the wearable apparatus 100 is worn on a user, the processor 140 may acquire a control command based on the changed posture information, and based on the wearable apparatus 100 being not worn on a user, the processor 140 may not perform any operation even if the posture information is changed.

In embodiments, only when a predetermined application is executed, the processor 140 may acquire a control command based on the changed posture information. For example, based on a predetermined application being not executed, the processor 140 may not perform any operation even if the posture information is changed.

In embodiments, based on the wearable apparatus 100 being worn on a user and a predetermined application being executed, the processor 140 may acquire a control command based on the changed posture information.

In embodiments, the processor 140 may acquire a control command based on the posture information and the changed posture information of the wearable apparatus 100. For example, the processor 140 may identify the posture information and the changed posture information of the wearable apparatus 100 through the sensor 130, and in case the posture information of the wearable apparatus 100 at a time point when a tap input is received is within a threshold range, the processor 140 may acquire a control command based on the changed posture information. For example, in case the surface of the display 110 of the wearable apparatus 100 is toward the sky, the processor 140 may acquire a control command based on the changed posture information.

In embodiments, the wearable apparatus 100 may further include a memory storing a neural network model, and the processor 140 may input the changed posture information into the neural network model and identify whether a tap input is an input for controlling the wearable apparatus 100. Here, the neural network model may be a model acquired by learning a relation between posture information changed as a sample and sample information regarding whether a tap input is an input for controlling the wearable apparatus 100.

However, embodiments are not limited thereto, and the neural network model may be a model acquired by learning a relation between posture information changed as a sample and a sample control command. In this case, the processor 140 may input the changed posture information into the neural network model, and acquire a control command.

In embodiments, the sensor 130 may include a sound sensor, and the processor 140 may further acquire sound information by a tap input through the sound sensor, and acquire a control command based on at least one of the changed posture information or the sound information.

For example, based on a sound according to a tap input coinciding with a time point of the posture change, the processor 140 may acquire a control command.

However, embodiments are not limited thereto, and the strap 120 may include a contact resistance sensor, and the processor 140 may receive contact information according to a tap input through the contact resistance sensor, and in case a time point of contact and a time point of the posture change coincide, the processor 140 may acquire a control command. In this case, the processor 140 may be in a state of being connected to the contact resistance sensor of the strap 120.

In embodiments, the wearable apparatus 100 may further include a camera photographing a direction perpendicular to the display 110 surface, and if the posture of the wearable apparatus 100 is changed according to a tap input, the processor 140 may photograph a direction perpendicular to the display 110 surface through the camera, and based on a user being included in the photographed image, the processor 140 may acquire a control command.

Figure 3:
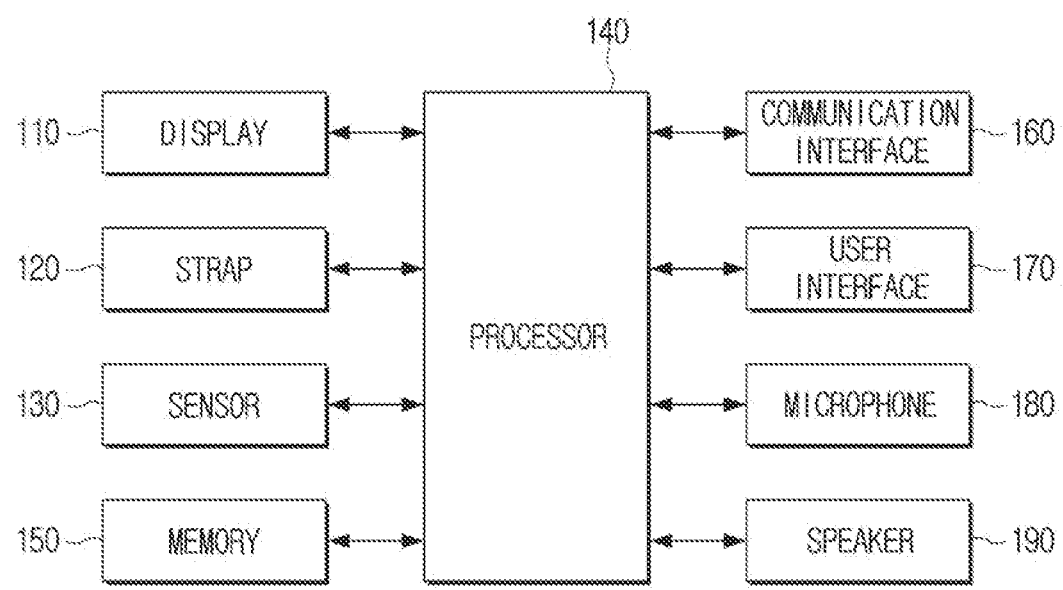
FIG. 3 is a block diagram illustrating a detailed configuration of a wearable apparatus according to an embodiment.

FIG. 3 is a block diagram illustrating a detailed configuration of the wearable apparatus 100 according to an embodiment of the disclosure. The wearable apparatus 100 may include a display 110, a strap 120, a sensor 130, and a processor 140. Also, according to FIG. 3, the wearable apparatus 100 may further include a memory 150, a communication interface 160, a user interface 170, a microphone 180, and a speaker 190. Among the components illustrated in FIG. 3, regarding parts that overlap with the components illustrated in FIG. 2, detailed explanation will be omitted.

The memory 150 may refer to hardware that stores information such as data in electronic or magnetic forms such that the processor 140, etc. can access. For this, the memory 150 may be implemented as at least one hardware among a non-volatile memory, a volatile memory, a flash memory, a hard disk drive (HDD) or a solid state drive (SSD), a RAM, a ROM, etc.

In the memory 150, at least one instruction or module necessary for the operations of the wearable apparatus 100 or the processor 140 may be stored. Here, an instruction is a code unit that instructs the operations of the wearable apparatus 100 or the processor 140, and it may have been drafted in a machine language which is a language that can be understood by a computer. A module may be a set of a series of instructions performing specific tasks in task units.

In the memory 150, data which is information in bit or byte units that can express characters, numbers, images, etc. may be stored.

In the memory 150, various kinds of neural network models may be stored. For example, in the memory 150, a neural network model for identifying whether the changed posture information is a tap input for the strap 120, etc. may be stored.

The memory 150 may be accessed by the processor 140, and reading/recording/correction/deletion/update, etc. for an instruction, a module, or data may be performed by the processor 140.

In embodiments, functions related to artificial intelligence according to the disclosure may be operated through the processor 140 and the memory 150.

The processor 140 may include one or a plurality of processors. Here, the one or plurality of processors may be generic-purpose processors such as a CPU, an AP, a digital signal processor (DSP), etc., graphic-dedicated processors such as a GPU, a vision processing unit (VPU), etc., or artificial intelligence-dedicated processors such as an NPU.

The one or plurality of processors may perform control to process input data according to predefined operation rules or an artificial intelligence model stored in the memory. In embodiments, based on the one or plurality of processors being artificial intelligence-dedicated processors, the artificial intelligence-dedicated processors may be designed as a hardware structure specified for processing of a specific artificial intelligence model. The predefined operation rules or the artificial intelligence model may be characterized in that they are made through learning.

Here, being made through learning may refer to that a basic artificial intelligence model is trained using a plurality of learning data by a learning algorithm, and predefined operations rules or an artificial intelligence model set to perform desired characteristics (or, purposes) are thereby made. Such learning may be performed in an apparatus itself wherein artificial intelligence is performed according to the disclosure, or through a separate server/system. Examples of learning algorithms may include supervised learning, unsupervised learning, semi-supervised learning, or reinforcement learning, but embodiments are not limited to the aforementioned examples.

An artificial intelligence model may include a plurality of neural network layers. Each of the plurality of neural network layers may have a plurality of weight values, and performs a neural network operation through the operation result of the previous layer and an operation among the plurality of weight values. The plurality of weight values included in the plurality of neural network layers may be optimized by the learning result of the artificial intelligence model. For example, the plurality of weight values may be updated such that a loss value or a cost value acquired at the artificial intelligence model during a learning process is reduced or minimized.

An artificial neural network may include a deep neural network (DNN), and there are, for example, a convolutional neural network (CNN), a deep neural network (DNN), a recurrent neural network (RNN), a restricted Boltzmann Machine (RBM), a deep belief network (DBN), a bidirectional recurrent deep neural network (BRDNN), or deep Q-networks, etc., but embodiments are not limited to the aforementioned examples.

The communication interface 160 may perform communication with various types of external apparatuses according to various types of communication methods. For example, the wearable apparatus 100 may perform communication with a server through the communication interface 160.

The communication interface 160 may include a Wi-Fi module, a Bluetooth module, an infrared communication module, and a wireless communication module, etc. Here, each communication module may be implemented in the form of at least one hardware chip.

A Wi-Fi module and a Bluetooth module may perform communication using a Wi-Fi method and a Bluetooth method, respectively. In the case of using a Wi-Fi module or a Bluetooth module, various types of connection information such as an SSID and a session key is transmitted and received first, and connection of communication is performed using the information, and various types of information can be transmitted and received thereafter. An infrared communication module performs communication according to an infrared Data Association (IrDA) technology of transmitting data to a near field wirelessly using infrared rays between visible rays and millimeter waves.

A wireless communication module may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc., other than the aforementioned communication methods.

In embodiments, the communication interface 160 may include a wired communication interface such as an HDMI, a DP, a thunderbolt, a USB, an RGB, a D-SUB, a DVI, etc.

In embodiments, the communication interface 160 may include at least one of a local area network (LAN) module, an Ethernet module, or a wired communication module that performs communication using a pair cable, a coaxial cable, or an optical fiber cable, etc.

The user interface 170 may be implemented as a button, a touch pad, a mouse, and a keyboard, or as a touch screen that can perform both of the display function and a manipulation input function. Here, a button may be various types of buttons such as a mechanical button, a touch pad, a wheel, etc. formed in any areas such as the front surface part, the side surface part, the rear surface part, etc. of the exterior of the main body of the wearable apparatus 100.

The microphone 180 is a component for receiving input of a sound and converting the sound to an audio signal. The microphone 180 may be electronically connected with the processor 140, and receive a sound by control by the processor 140.

For example, the microphone 180 may be formed as an integrated type that is integrated with the upper side or the front surface direction, the side surface direction, etc. of the wearable apparatus 100. In embodiments, the microphone 180 may be provided on a remote control that is separate from the wearable apparatus 100. In this case, the remote control may receive a sound through the microphone 180, and provide the received sound to the wearable apparatus 100.

The microphone 180 may include various components such as a microphone collecting a sound in an analog form, an amp circuit that amplifies the collected sound, an A/D conversion circuit that samples the amplified sound and converts the sound into a digital signal, a filter circuit that removes noise components from the converted digital signal, etc.

Also, the microphone 180 may be provided as a plurality of microphones. In this case, the processor 140 may analyze sounds input from the plurality of microphones, and identify the locations from which the sounds are output.

In embodiments, the microphone 180 may also be implemented in a form of a sound sensor, and it can be in any type if it is a component that can collect a sound.

The speaker 190 may receive input of an electronic signal, and vibrate the vibration plate based on the input electronic signal, and emit a sound. In particular, the speaker 190 has a sound emission hole on one side of the speaker 190, and may emit a sound through the sound emission hole.

As described above, a user can control the wearable apparatus 100 through a tap input for the strap 120 having a wide surface area, and thus user convenience can be improved. Also, the wearable apparatus 100 can perform an operation corresponding to a tap input just with conventional hardware components, and thus increase of the manufacturing cost can be prevented.

Hereinafter, examples of the operation of the wearable apparatus 100 will be described in more detail with reference to FIG. 4 through FIG. 20. In FIG. 4 through FIG. 20, individual embodiments will be described for the convenience of explanation. However, the individual embodiments in FIG. 4 through FIG. 20 may also be implemented in any combination.

Figure 4:
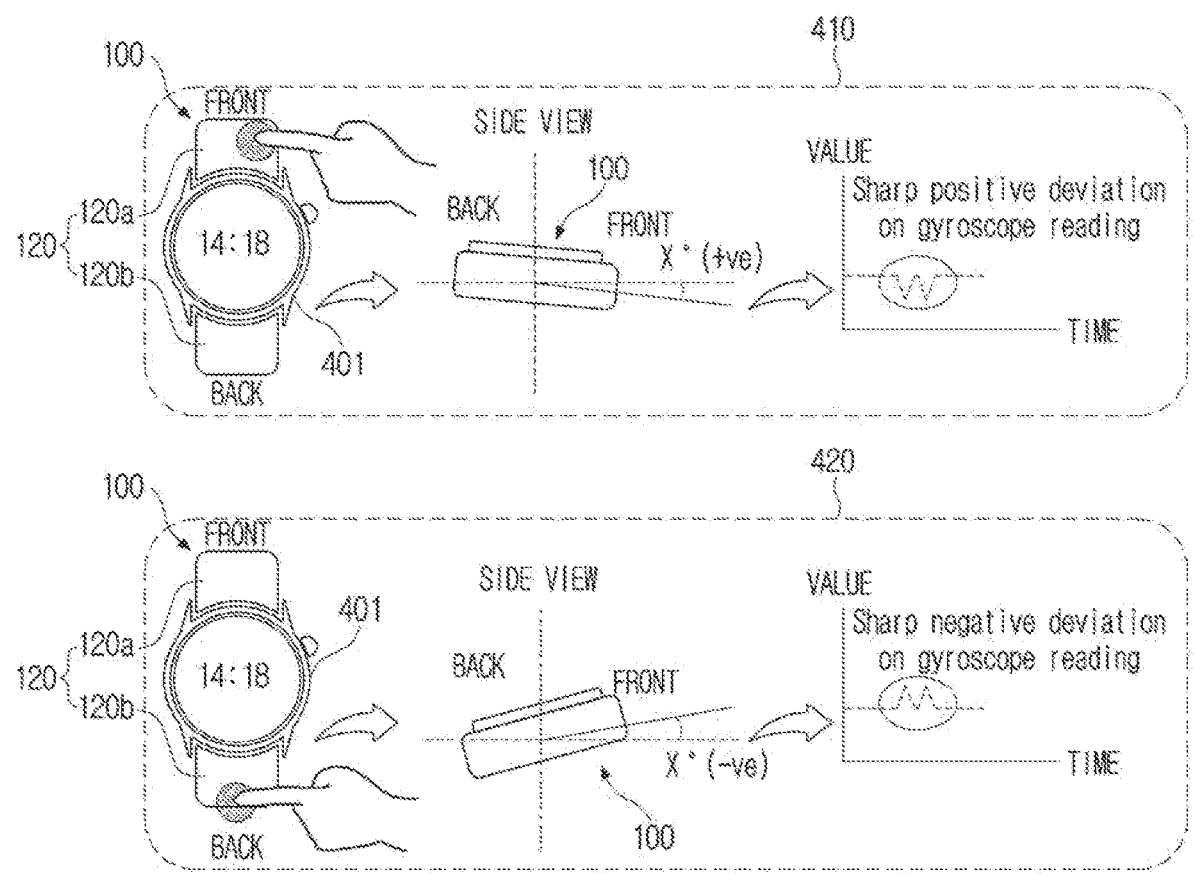
FIG. 4 is a diagram for illustrating a case wherein a user's tap input for a strap is received according to an embodiment.

FIG. 4 is a diagram for illustrating a case wherein a user's tap input for the strap 120 is received according to an embodiment of the disclosure.

As illustrated in FIG. 4, the wearable apparatus 100 may include a main body 401, a first portion 120a of the strap 120 connected to one side of the main body, and a second portion 120b of the strap 120 connected to another side (the back) of the main body.

First, as shown in the example 410 in FIG. 4, if a user's tap input for the first strap 120a is received, the wearable apparatus 100 may instantaneously be tilted to the front side. The processor 140 may acquire the changed posture information of the wearable apparatus 100 through the sensor 130. For example, the processor 140 may acquire gyroscope data of the wearable apparatus 100 in real time through the gyro sensor, and identify instantaneous change as in the graph in the example 410 in FIG. 4.

In embodiments, as in the example 420 in FIG. 4, if a user's tap input for the second strap 120b is received, the wearable apparatus 100 may instantaneously be tilted to the back side. The processor 140 may acquire the changed posture information of the wearable apparatus 100 through the sensor 130. For example, the processor 140 may acquire gyroscope data of the wearable apparatus 100 in real time through the gyro sensor, and identify instantaneous change as in the graph in the example 420 in FIG. 4.

Figure 5:
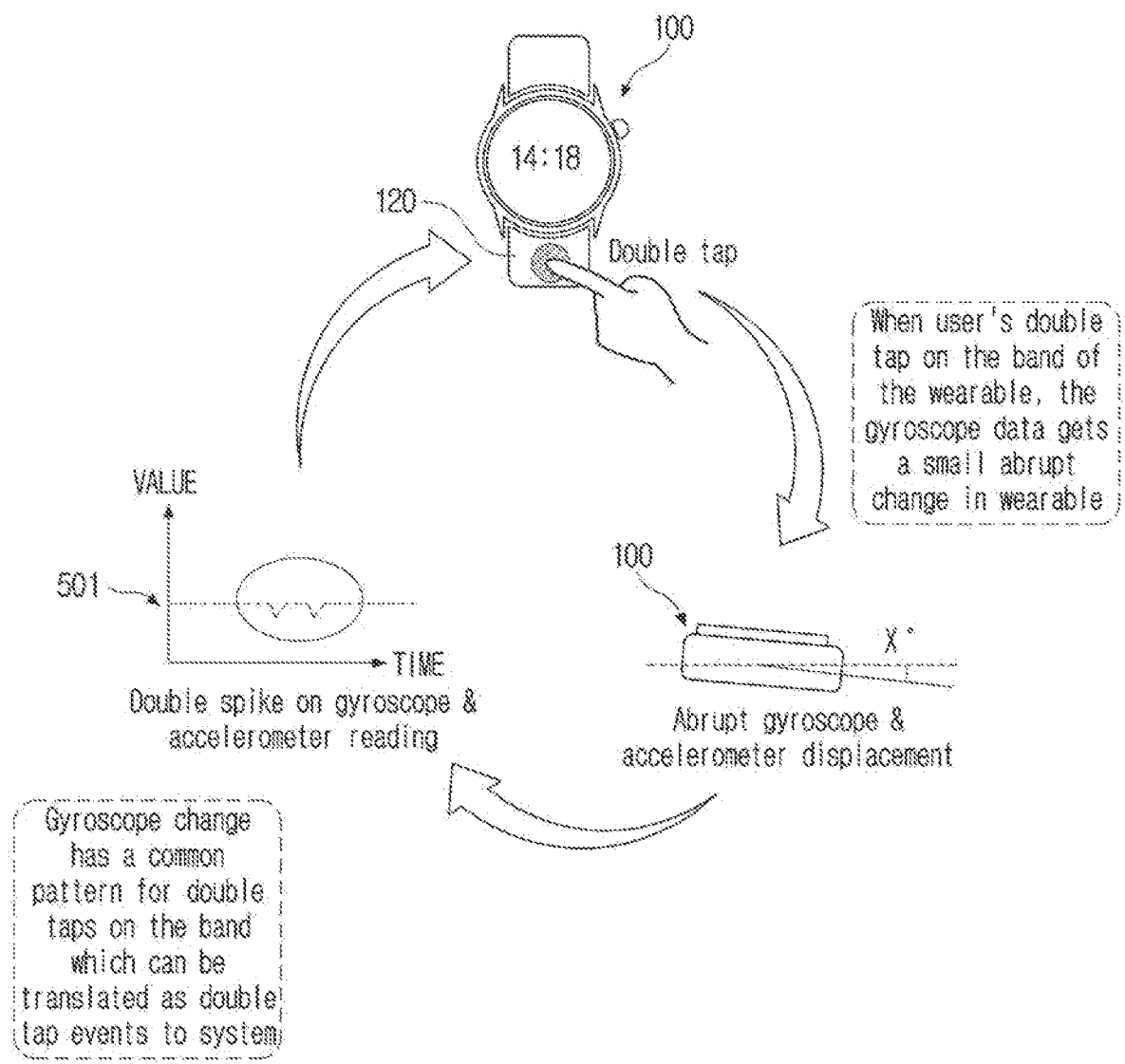
FIG. 5 is a diagram for illustrating an operation after a tap input was received according to an embodiment.

FIG. 5 is a diagram for illustrating an operation after a tap input was received according to an embodiment of the disclosure.

First, as in the upper drawing in FIG. 5, a user's double tap input for the strap 120 may be received. In this case, as shown in FIG. 5, the posture of the wearable apparatus 100 may be changed, and thus the processor 140 may acquire gyroscope data through the gyro sensor. The gyroscope data may include two instances of spikes as in graph 501 in FIG. 5, and if the two times of spikes are data of a predetermined pattern, the processor 140 may identify that the two instances of spikes are caused by the user's double tap input.

If it is identified that a user's double tap input was received, the processor 140 may perform an operation according to a control command corresponding to the double tap input.

The example shown in FIG. 5 relates to a user's double tap on the strap 120, for convenience of explanation, but embodiments are not limited thereto. For example, one time of tap input for the strap 120 may be received, or three times of tap inputs for the strap 120 may be received, and the processor 140 may perform different operations according to each input. In embodiments, the processor 140 may further consider a maintenance time of a tap for the strap 120. For example, a user may perform a tap for the strap 120 shortly, or maintain a tap for the strap 120 to be long. The processor 140 may identify a maintenance time of a tap, and perform different operations according to each input.

In embodiments, in FIG. 4 and FIG. 5, it was described that a gyro sensor is used, but embodiments are not limited thereto. For example, the processor 140 may identify a user's tap input for the strap 120 using at least one of a gyro sensor, an acceleration sensor, a magnetometer sensor, or a sound sensor.

Figure 6:
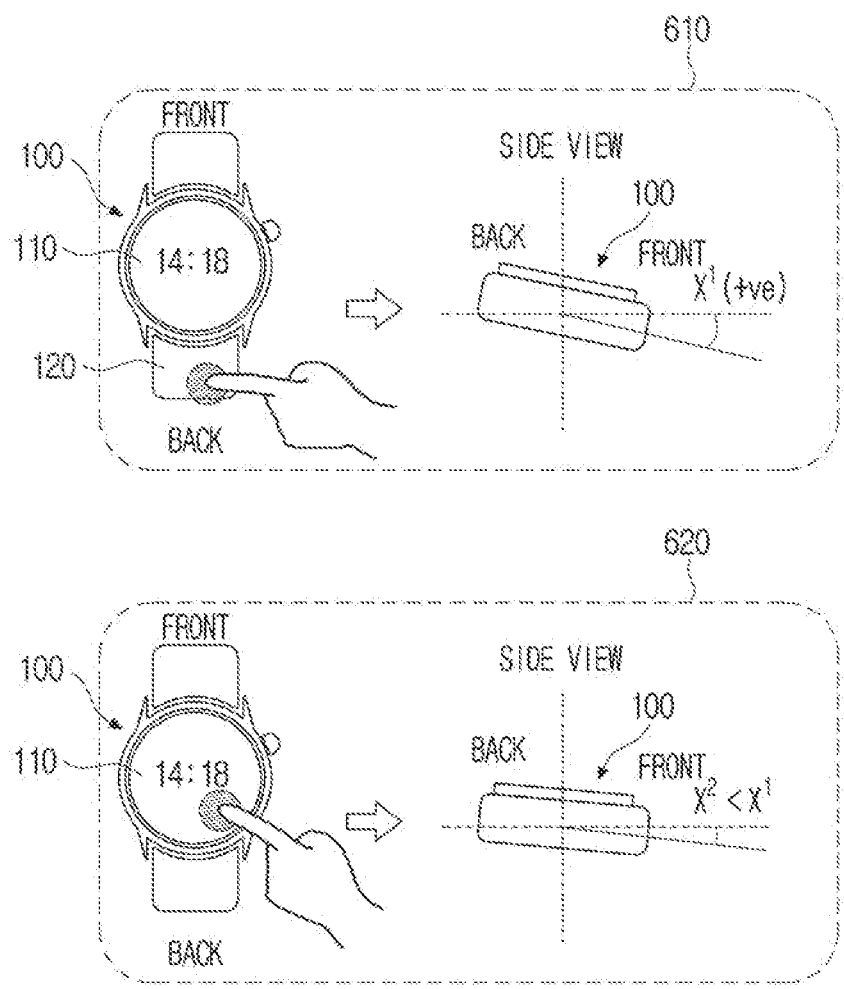
FIG. 6 is a diagram for illustrating a method of distinguishing a case of touching a strap and a case of touching a display according to an embodiment.

FIG. 6 is a diagram for illustrating a method of distinguishing a case of touching the strap 120 and a case of touching the display 110 according to an embodiment of the disclosure.

The processor 140 may identify the degree that the wearable apparatus 100 is tilted using the sensor 130.

For example, if a user's tap input for the strap 120 is received, as shown in example 610 in FIG. 6, the processor 140 may identify the degree that the wearable apparatus 100 is tilted through the sensor 130. Here, if the degree that the wearable apparatus 100 is tilted is greater than or equal to a threshold angle $x^1$, the processor 140 may identify that a user's tap input for the strap 120 was received.

In embodiments, if a user's tap input for the display 110 is received, as shown in example 620 in FIG. 6, the processor 140 may identify the degree that the wearable apparatus 100 is tilted through the sensor 130. Here, if the degree that the wearable apparatus 100 is tilted is smaller than the threshold angle $x^1$, for example if the wearable apparatus 100 is tilted at an angle $x^2$, the processor 140 may identify that a user's tap input for the display 110 was received. In embodiments, a user's tap input for the display 110 may refer to a tap input of the user that is received on the display 110.

Here, the threshold angle may be acquired as a tap input for the strap 120 and a tap input for the display 110 are repeated. Also, the threshold angle may be corrected as a user uses the wearable apparatus 100. For example, there may be a difference in the strength of a tap input per user, and the processor 140 may identify a tap input for the display 110 as a tap input for the strap 120. In this case, the processor 140 may malfunction, but the user may input a control command cancelling the malfunction. In case such a control command cancelling a malfunction is repeated, the processor 140 may change the value of the threshold angle.

In embodiments, the display 110 may be implemented as one of a resistance film-based type, a projection capacitance-based type, a surface capacitance-based type, a surface elastic wave-based type, or an infrared optical image-based type, and the processor 140 may identify a tap input for the display 110 as a touch input.

The example shown in FIG. 6 relates to distinguishing a tap input for the strap 120 and a tap input for the display 110 based on the degree that the wearable apparatus 100 is tilted, but embodiments are not limited thereto. For example, the processor 140 may acquire sound information and distinguish a tap input for the strap 120 and a tap input for the display 110. For example, the display 110 is implemented as a plastic material such as glass, and the strap 120 is implemented as a material such as leather, rubber, metal, etc., and thus a sound according to a tap input may be different. The processor 140 may distinguish a tap input for the strap 120 and a tap input for the display 110 based on such a sound difference.

Also, in FIG. 6, a tap input for the display 110 is provided as an example, for the convenience of explanation, but embodiments are not limited thereto. For example, the processor 140 may distinguish a tap input for the strap 120 and a tap input for the main body 401 of the wearable apparatus 100 based on the degree that the wearable apparatus 100 is tilted.

Figure 7:
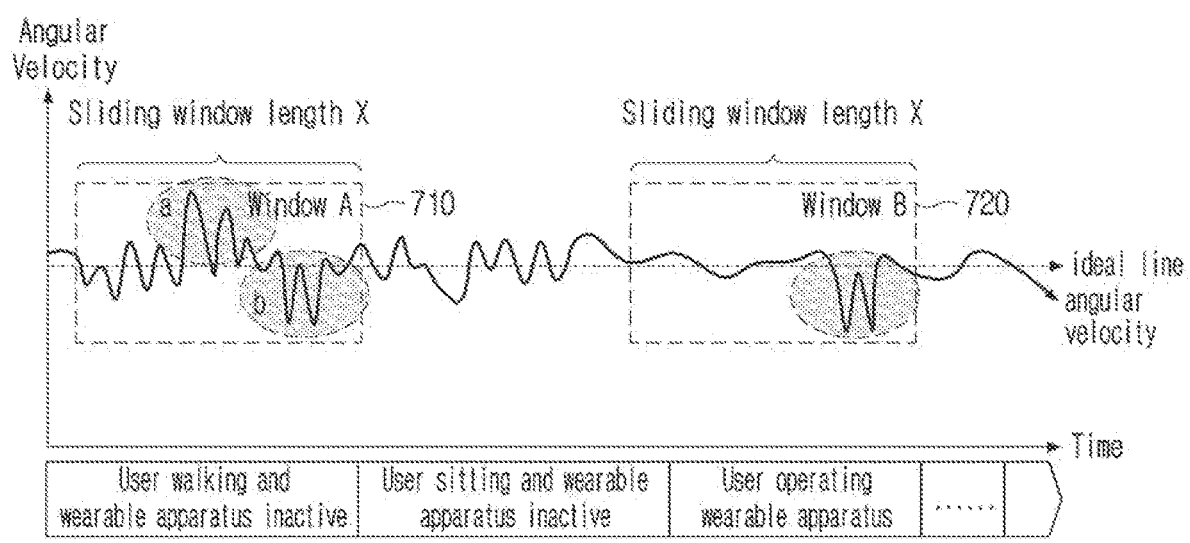
FIG. 7 is a diagram for illustrating a method of using a gyro sensor according to an embodiment.

FIG. 7 is a diagram for illustrating a method of using a gyro sensor according to an embodiment of the disclosure.

As illustrated in FIG. 7, the processor 140 may acquire posture information of the wearable apparatus 100 in real time through the gyro sensor. First, based on a user walking without operating the wearable apparatus 100, the angular velocity may show a change of a specific level or larger as in the window A 710. In this case, the processor 140 may identify a glitch near a and b, but as the angular velocity was showing a change of a specific level or larger before the glitch occurred, the processor 140 may not identify the glitch as a tap input.

Afterwards, based on the user sitting without using the wearable apparatus 100 (time between the window A 710 and the window B 720), the angular velocity may show a change smaller than the specific level, and a glitch also may not occur.

Afterwards, based on the user operating the wearable apparatus 100, the angular velocity may show a change smaller than the specific level as in the window B 720. Here, a glitch may occur according to the user's tap input for the strap 120, and if the glitch occurs in a state wherein the angular velocity shows a change smaller than the specific level, the processor 140 may identify that the user's tap input for the strap 120 was received.

Figure 8:
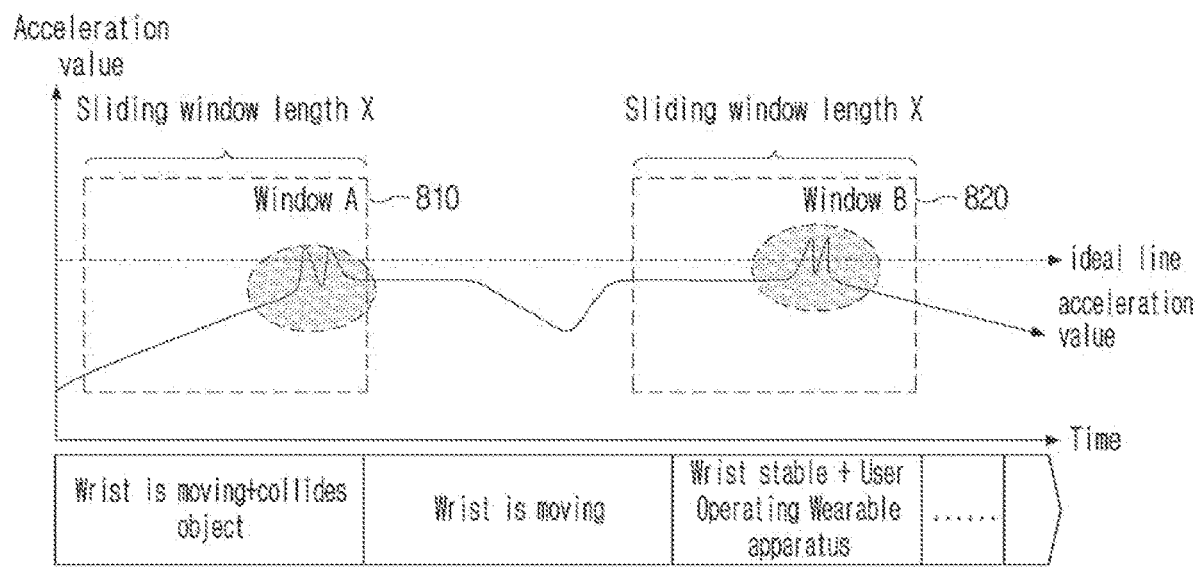
FIG. 8 is a diagram for illustrating a method of using an acceleration sensor according to an embodiment.

FIG. 8 is a diagram for illustrating a method of using an acceleration sensor according to an embodiment of the disclosure.

As illustrated in FIG. 8, the processor 140 may acquire posture information of the wearable apparatus 100 in real time through the acceleration sensor. First, the acceleration value may increase and then a glitch may occur as in the window A 810, and in this case, the processor 140 may identify that the user is moving the wrist based on the acceleration value that linearly increases before the glitch, and identify that the wrist collided with an object based on the glitch that occurred afterwards. That is, the processor 140 may identify that there was no tap input by the user.

Afterwards, the acceleration value may maintain a specific level and then a glitch may occur as in the window B 820, and in this case, the processor 140 may identify that the user is operating the wearable apparatus 100 based on the acceleration value that is maintained in a specific level, and identify that the user's tap input for the strap 120 was received based on the glitch that occurred afterwards.

Figure 9:
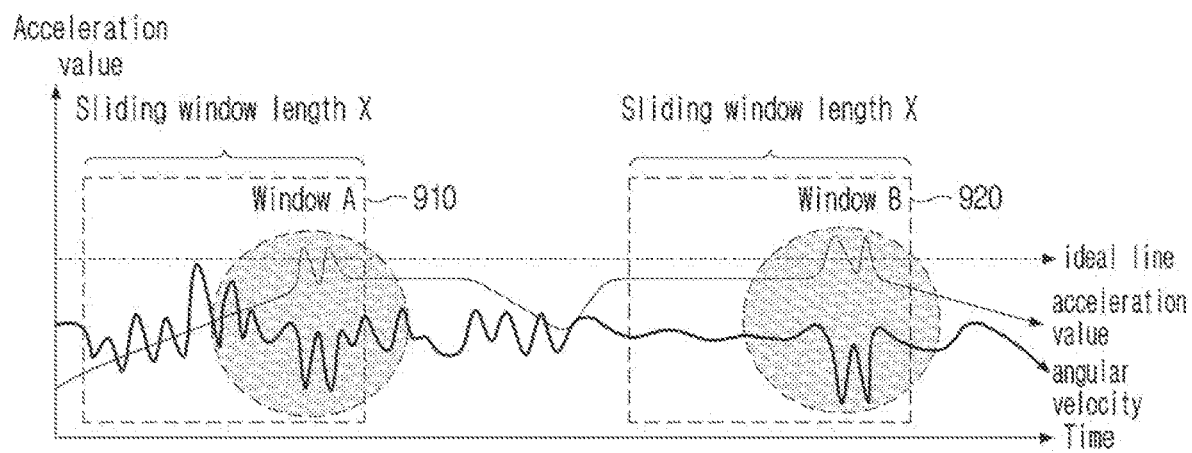
FIG. 9 is a diagram for illustrating a method of using a gyro sensor and an acceleration sensor according to an embodiment.

FIG. 9 is a diagram for illustrating a method of using a gyro sensor and an acceleration sensor according to an embodiment of the disclosure.

FIG. 9 is a diagram wherein the graph regarding the acceleration value in FIG. 8 and the graph regarding the angular velocity in FIG. 7 are overlapped, and the processor 140 may identify whether a user's tap input for the strap 120 was received using both of the gyro sensor and the acceleration sensor.

First, as the angular velocity showed a change of a specific level or larger and then a glitch occurred while the acceleration value was increasing in the window A 910, the processor 140 may identify that there was no tap input for the strap 120 by the user.

Then, as the angular velocity showed a change smaller than the specific level and then a glitch occurred while the acceleration value was maintained in a specific level in the window B 920, the processor 140 may identify that the user's tap input for the strap 120 was received.

As two types of sensors are used as described above, precision for a tap input for the strap 120 can be further improved.

However, embodiments are not limited thereto, and the processor 140 may identify whether a tap input for the strap 120 was received by further using the magnetometer sensor as well as the gyro sensor and the acceleration sensor.

Figure 10:
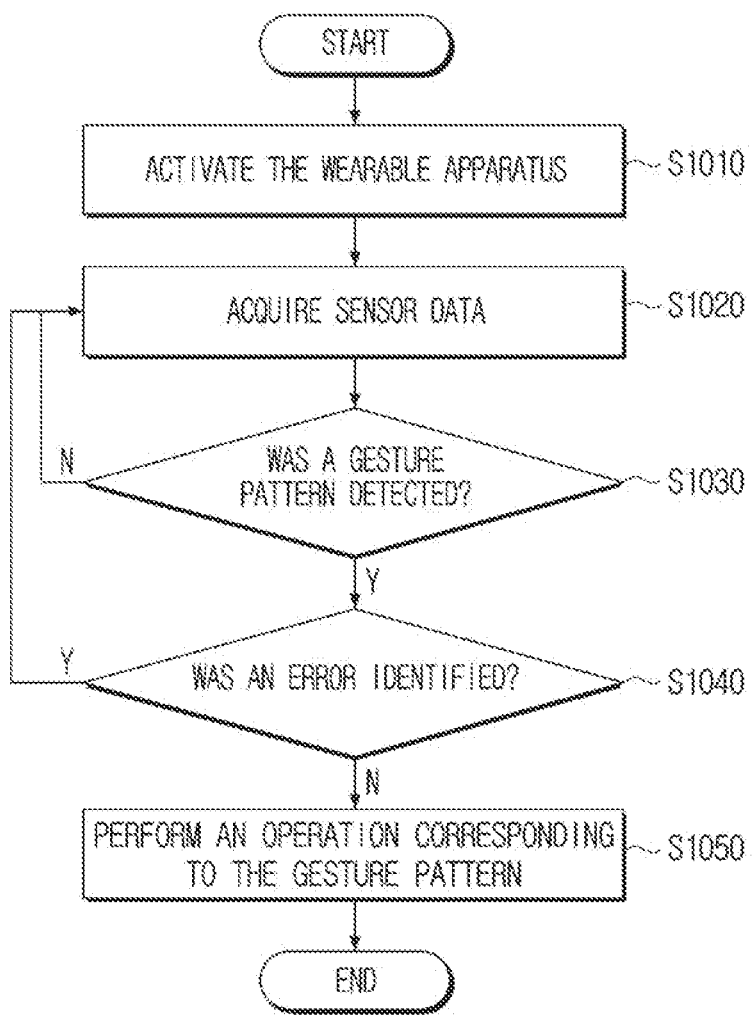
FIG. 10 is a flow chart for illustrating an operation of a wearable apparatus related to a tap input according to an embodiment.

FIG. 10 is a flow chart for illustrating an operation of the wearable apparatus 100 related to a tap input according to an embodiment of the disclosure.

First, the processor 140 may activate the wearable apparatus 100 in operation S1010. For example, the processor 140 may provide power to the sensor 130 after booting.

The processor 140 may acquire sensor data through the sensor 130 in operation S1020. For example, the processor 140 may acquire sensor data based on at least one of the gyro sensor, the acceleration sensor, the magnetometer sensor, or the sound sensor.

However, embodiments are not limited thereto, and the processor 140 may acquire sensor data through the sensor 130 only in case the wearable apparatus 100 is worn on a user. Through such an operation, power consumption of the wearable apparatus 100 can be reduced.

In embodiments, the processor 140 may provide power only to one or some of the gyro sensor, the acceleration sensor, the magnetometer sensor, or the sound sensor, and if a wakeup signal is received from the user, the processor 140 may provide power to the remaining sensors. For example, in a state wherein power is provided only to the acceleration sensor and power is not provided to the remaining sensors, if an acceleration value of a predetermined pattern is identified according to the user's manipulation, the processor 140 may identify that a wakeup signal was received, and provide power to the remaining sensors. Afterwards, if a tap input for the strap 120 is received, the processor 140 may identify whether there was a tap input through the plurality of sensors. Through such an operation, power consumption can be reduced in usual times, and at the same time, precision for a tap input can be maintained.

The processor 140 may identify whether a specific gesture pattern is detected in operation S1030. For example, the processor 140 may identify whether a detected tap input is a specific gesture pattern. If it is identified that the specific gesture pattern is not detected, for example if the detected tap input is not the specific gesture pattern, the processor 140 may maintain the operation of acquiring sensor data. In embodiments, if it is identified that the tap input is a specific gesture pattern, the processor 140 may identify whether the specific gesture pattern is an error in operation S1040.

For example, the processor 140 may further acquire sound information, and in case the time point of receiving the gesture pattern and the time point of receiving the sound are the same, the processor 140 may identify that the specific gesture pattern is not an error.

In embodiments, the processor 140 may identify at least one of angular velocity information, acceleration information, or magnetometer information, and in case the angular velocity information during a first threshold time before the tap input is received is within a first threshold range, the acceleration information during the first threshold time is within a second threshold range, and the magnetometer information during the first threshold time is within a third threshold range, the processor 140 may identify that the specific gesture pattern is not an error.

In embodiments, if the tap input is received in a state wherein the wearable apparatus 100 has been released from a lock state, the processor 140 may determine that the specific gesture pattern is not an error.

In embodiments, in case there is no user manipulation through the display 110 while the tap input is received, the processor 140 may identify that the specific gesture pattern is not an error.

In embodiments, in case the wearable apparatus 100 is worn on the user and a predetermined application has been executed, the processor 140 may identify that the specific gesture pattern is not an error.

Through methods as above, the processor 140 may distinguish an input not intended by the user such as a rapid wrist movement, etc., and a tap input intended by the user.

If it is identified that the specific gesture pattern is an error, the processor 140 may maintain the operation of acquiring sensor data. In embodiments, if it is identified that the specific gesture pattern is not an error, the processor 140 may perform an operation corresponding to the gesture pattern in operation S1050.

Figure 11:
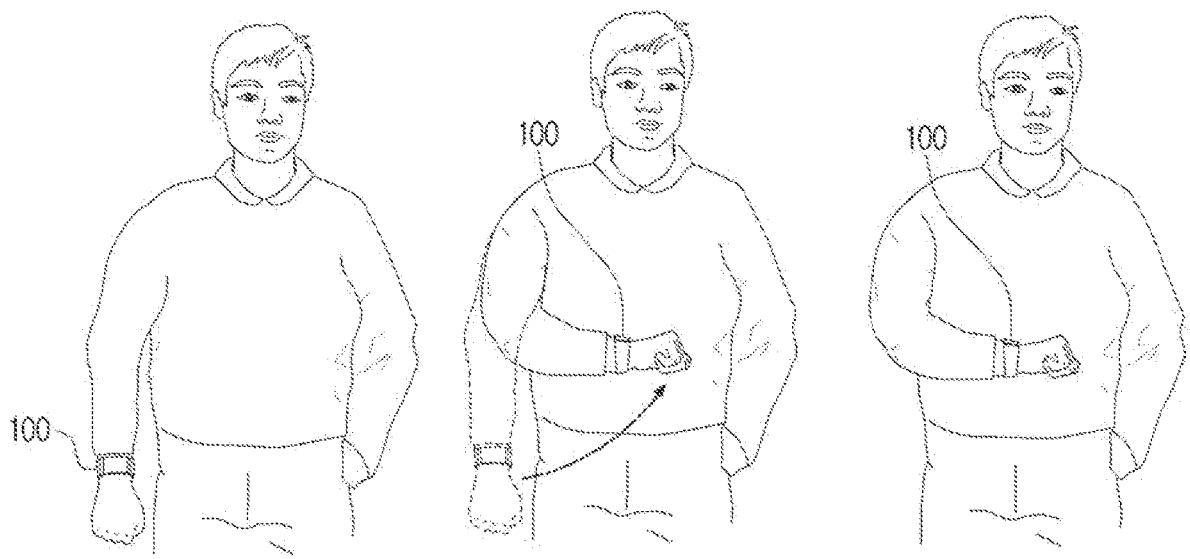
FIG. 11 to FIG. 13 are diagrams for illustrating posture change information of a wearable apparatus according to a user's arm movement according to an embodiment.
Figure 12:
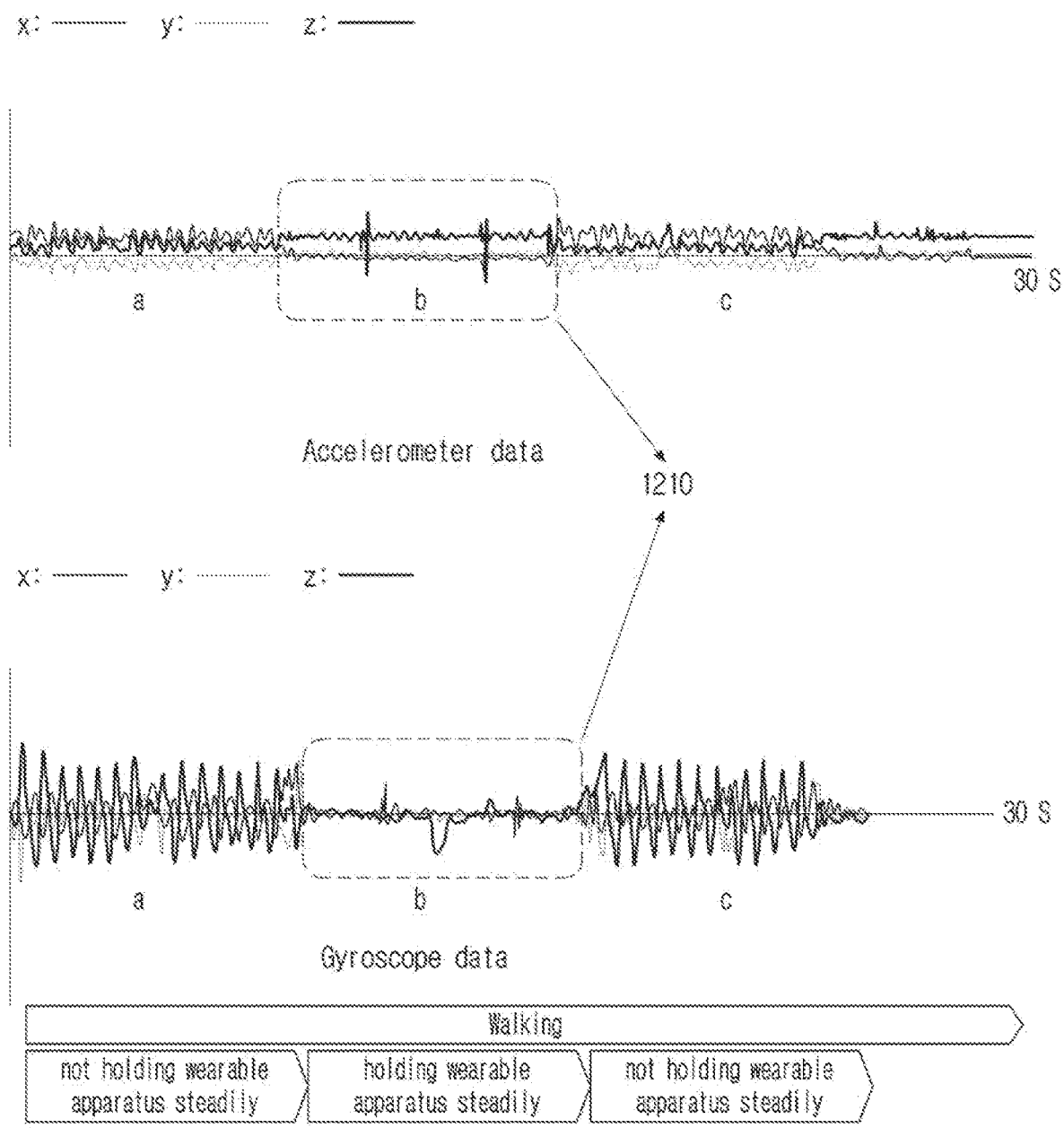
Figure 13:
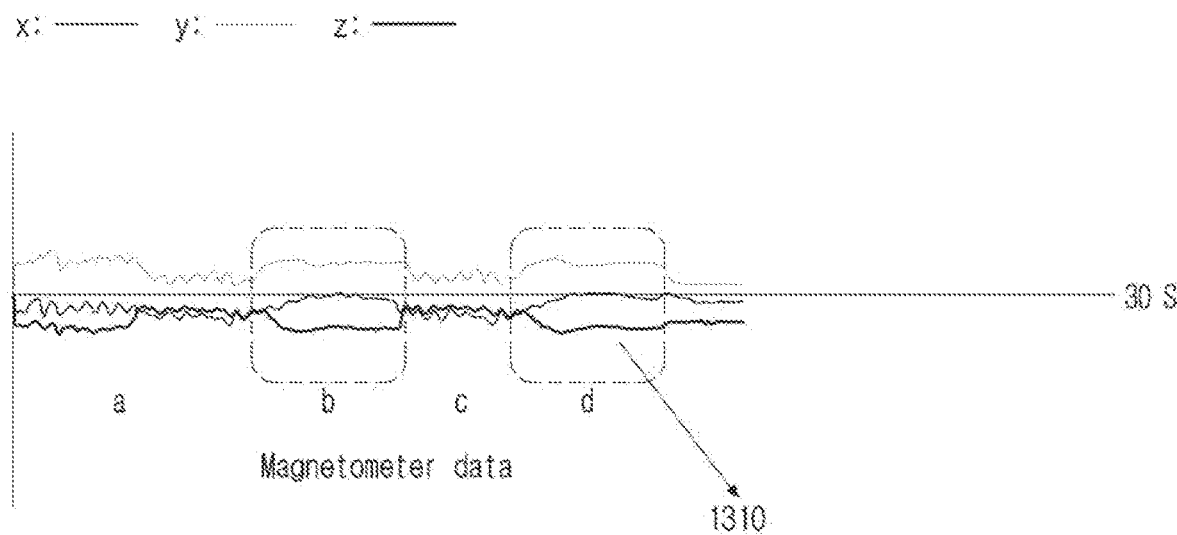

FIG. 11 to FIG. 13 are diagrams for illustrating posture change information of the wearable apparatus 100 according to a user's arm movement according to an embodiment of the disclosure.

First, as illustrated in the left side of FIG. 11, a user may be in a state of not using the wearable apparatus 100. Afterwards, as illustrated in the center of FIG. 11, the user may raise his arm to use the wearable apparatus 100. Then, as illustrated in the right side of FIG. 11, there may be a time that the user maintains his arm before using the wearable apparatus 100.

The processor 140 may detect the user's operation of raising his arm through acceleration information. For example, the sensor 130 may include an acceleration sensor, and if the acceleration information increases from less than or equal to a first value to greater than or equal to a second value greater than the first value during a second threshold time which is before a tap input is received, and then becomes less than or equal to the first value, and second change information of the acceleration information according to the tap input is greater than or equal to a second threshold value, the processor 140 may acquire a control command based on the acceleration information. In case the user's intent of using the wearable apparatus 100 is not clearly identified as in a case wherein the user raises his arm, it is necessary to detect a tap input more strictly.

For example, as illustrated in FIG. 12 and FIG. 13, the processor 140 may identify whether the arm is maintained to be constant through the sensor 130 before a tap input is received. For example, in the a section and the c section in FIG. 12, the wearable apparatus 100 may be in a shaking state, and in the b section 1210, the wearable apparatus 100 may not be in a shaking state. The processor 140 may identify that the changes of the acceleration value and the angular velocity of the wearable apparatus 100 are not greater than in the a section and the c section, as in the b section 1210. In case a glitch occurs inside the b section 1210, the processor 140 may identify that the user's tap input for the strap 120 was received. In contrast, in case a glitch occurs inside the a section or the c section, as the wearable apparatus 100 was in a shaking state, the processor 140 may identify that the user's tap input for the strap 120 was not received.

In embodiments, as illustrated in FIG. 13, in the a section and the c section, the wearable apparatus 100 may be in a shaking state, and in the b section and the d section 1310, the wearable apparatus 100 may not be in a shaking state. The processor 140 may identify that the change of the magnetometer of the wearable apparatus 100 is not greater than in the a section and the c section, as in the b section and the d section 1310. Based on the assumption of a state wherein the change of the magnetometer is stable as in the b section and the d section 1310, the processor 140 may identify whether the user's tap input for the strap 120 was received, in consideration of the acceleration value and the angular velocity as in FIG. 12. Through such an operation, precision regarding whether a tap input was received can be improved.

In embodiments, the identification of whether the wearable apparatus 100 is shaking from the sensor data as in FIG. 12 or FIG. 13 may be performed using a neural network model.

FIG. 14 to FIG. 20 are diagrams for illustrating a method of utilizing a tap input for the strap 120 according to various embodiments of the disclosure.

Figure 14:
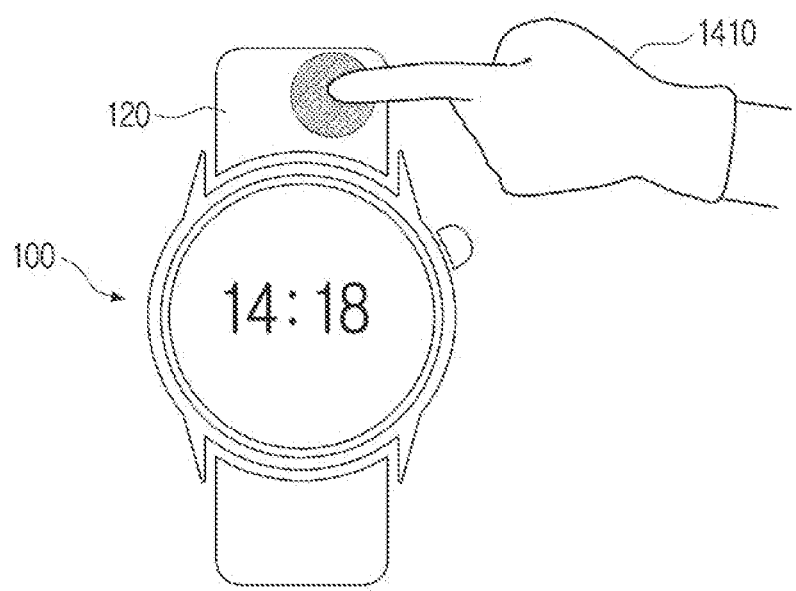
FIG. 14 to FIG. 20 are diagrams for illustrating a method of utilizing a tap input for a strap according to various embodiments.

First, as illustrated in FIG. 14, if a tap input for the strap 120 is received, the processor 140 may perform an operation based on the changed posture information of the wearable apparatus 100. In particular, a tap input for the strap 120 itself is not an electromagnetic operation, and thus a user can perform the same manipulation while wearing a glove 1410. That is, in the case of a related art touch display, control was impossible while wearing a glove. However, embodiments may allow such inconvenience to be overcome through a tap input for the strap 120.

Figure 15:
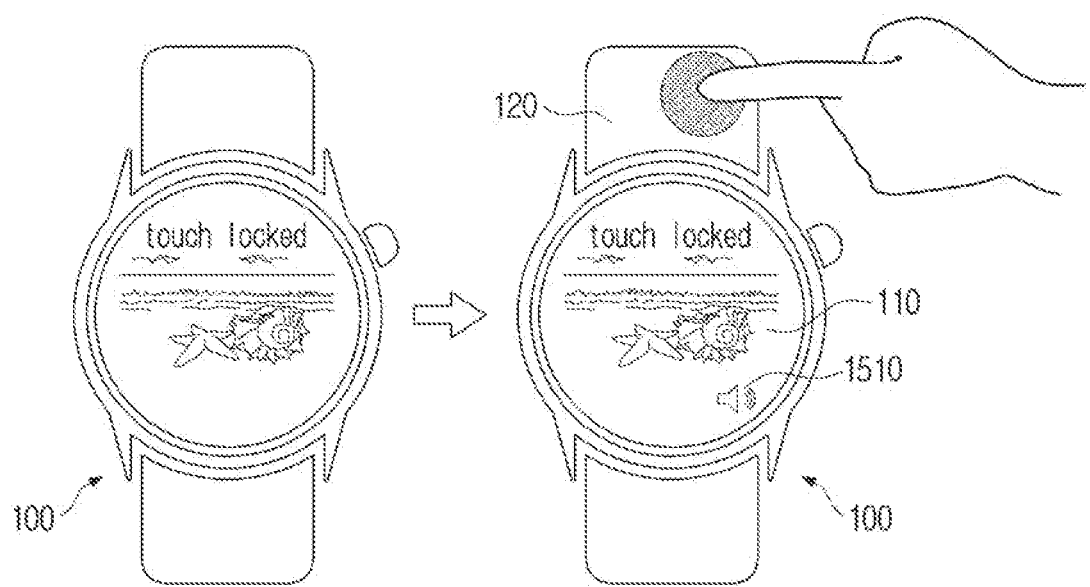

In embodiments, as illustrated in FIG. 15, a user can watch a video through the wearable apparatus 100. In this case, for preventing interfering with viewing with a wrong touch, etc., the processor 140 may change a touch for the display 110 to a locked state (touch locked). In this case, the user may change an amount of the sound of the video output by the wearable apparatus 100, for example by changing a volume level, through a tap input for the strap 120. That is, in a related art wearable apparatus, control was possible only after releasing a locked state of a touch. However, embodiments may allow a tap input for the strap 120, and control may be possible without releasing a locked state, and inconvenience as above can be overcome.

The example shown in FIG. 15 relates to changing a volume level, for the convenience of explanation, but embodiments are not limited thereto. For example, in case a touch for the display 110 is in a locked state, the processor 140 may change the luminance, the color impression, the time point of video reproduction, etc. through a tap input for the strap 120.

In embodiments, if a tap input for the strap 120 is received, the processor 140 may acquire the changed posture information of the wearable apparatus 100 according to the tap input through the sensor 130. Then, the processor 140 may acquire a control command corresponding to the changed posture information based on an application that is being executed.

Figure 16:
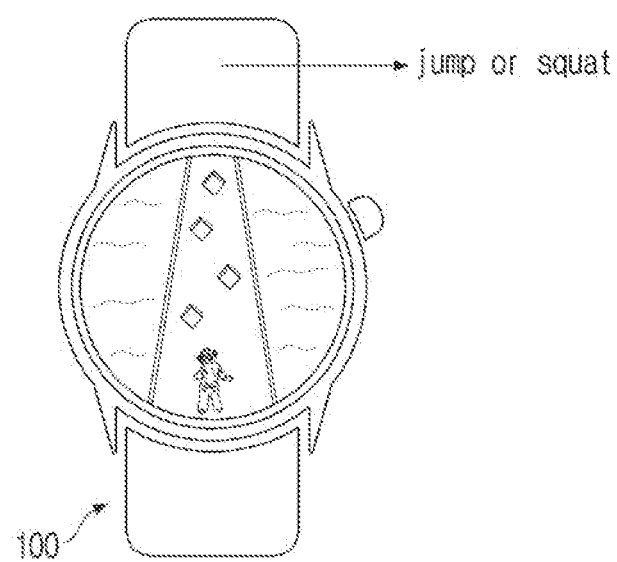

For example, as illustrated in FIG. 16, based on a first game being executed, the processor 140 may identify a tap input for the strap 120 as jump or squat. However, embodiments are not limited thereto, and based on a second game being executed, the processor 140 may identify a tap input for the strap 120 as stopping of the game. Then, based on the second game being stopped, the processor 140 may identify a tap input for the strap 120 as resuming of the game. That is, the processor 140 may acquire a control command corresponding to the changed posture information based on the state of an application that is being executed.

In embodiments, based on a video application or a music application being executed, the processor 140 may identify a tap input for the strap 120 as a volume-up command or a volume-down command.

Figure 17:
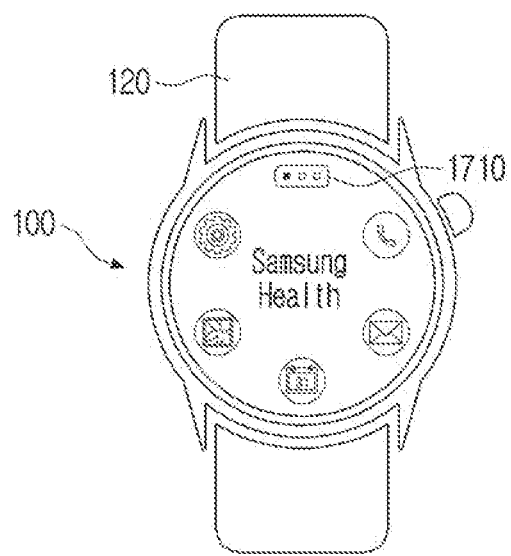

In embodiments, the processor 140 may display a plurality of indicators 1710 corresponding to one of a plurality of screens or respectively corresponding to the plurality of screens. In this case, as illustrated in FIG. 17, the processor 140 may identify a tap input for the strap 120 as a control command changing to another screen among the plurality of screens.

Figure 18:
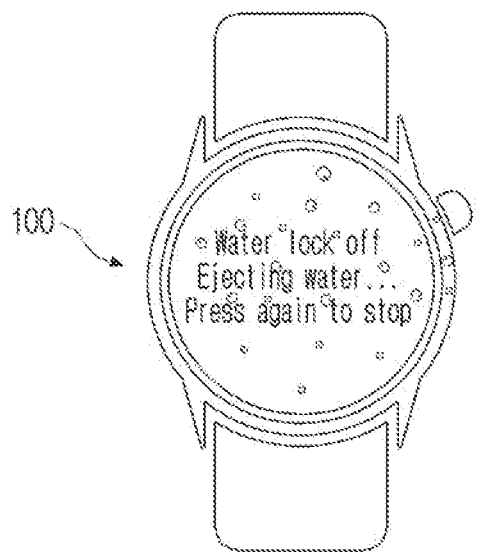

Also, there may be a problem that the wearable apparatus 100 is exposed to water or dust and a touch error occurs, as illustrated in FIG. 18. However, as a tap input for the strap 120 is not an electromagnetic operation, embodiments may allow the wearable apparatus to be controlled even in the presence of water or dust, and thus inconvenience can be overcome.

Figure 19:
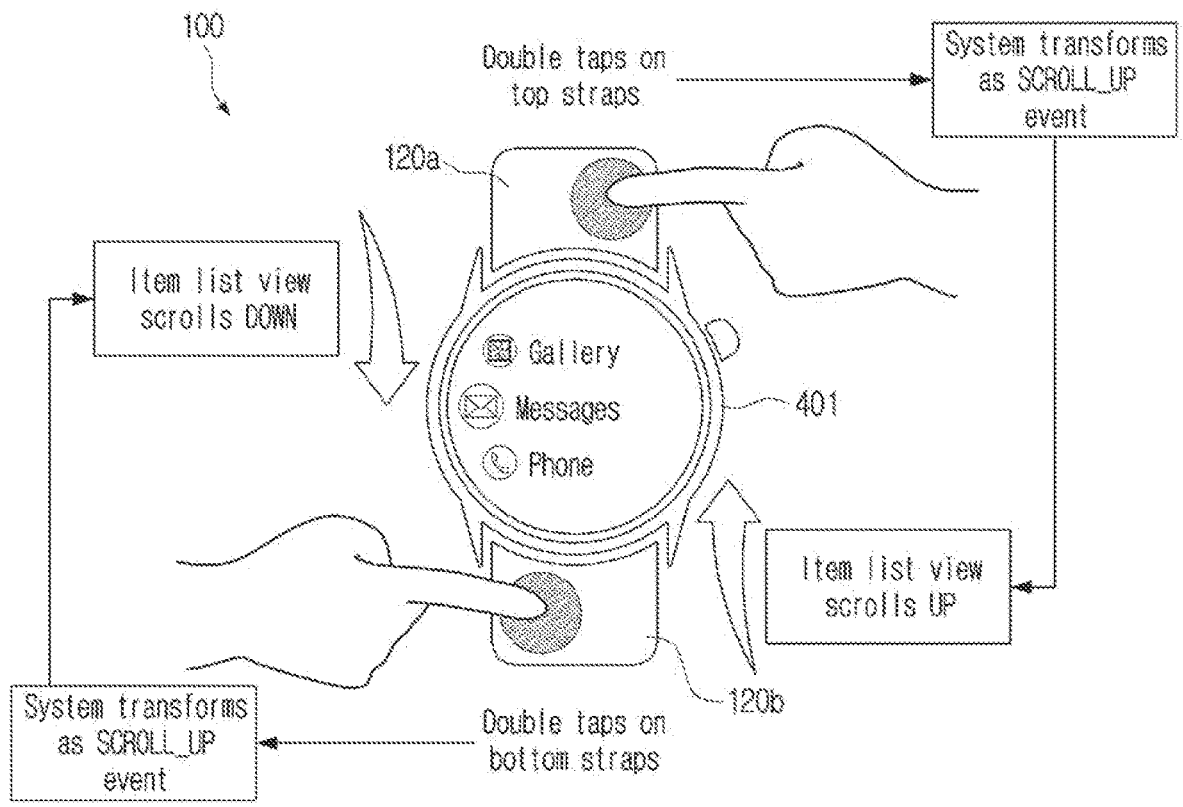

In embodiments, as illustrated in FIG. 19, the wearable apparatus 100 may include a main body 401, a first strap 120*a* connected to one side of the main body 401, and a second strap 120*b* connected to the other side of the main body 401, and the processor 140 may perform a scroll-up operation according to a tap input for the first strap 120*a*, and perform a scroll-down operation according to a tap input for the second strap 120*b*.

Figure 20:
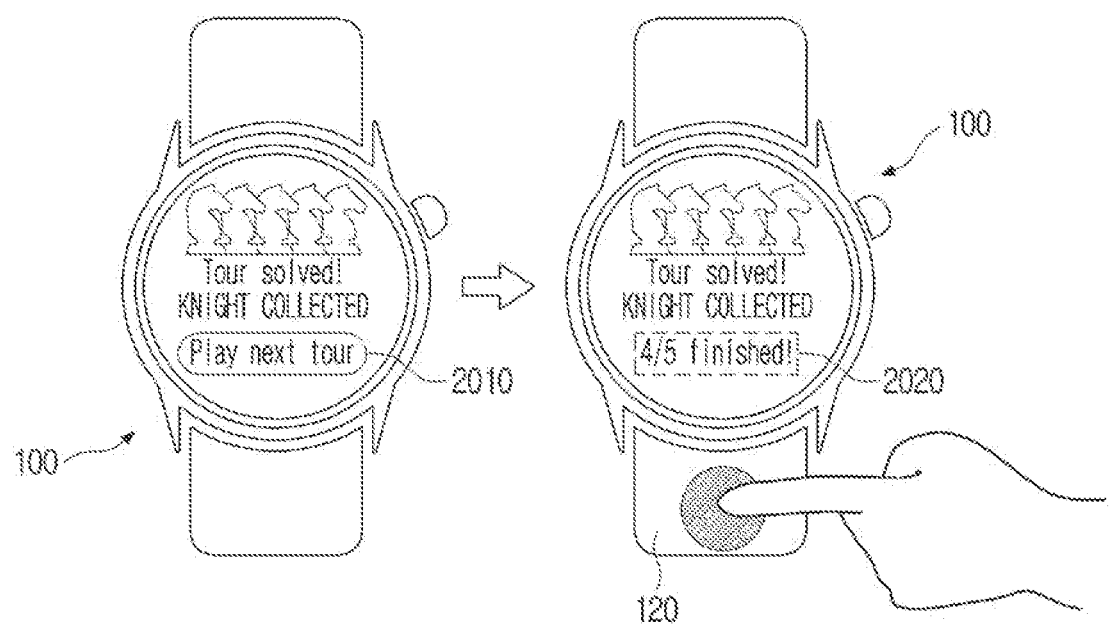

In embodiments, the processor 140 may omit a button on the lower left side (Play next tour) of FIG. 20, and provide more information as in the right side of FIG. 20. In this case, the processor 140 may identify a tap input for the strap 120 as manipulating the omitted button.

Figure 21:
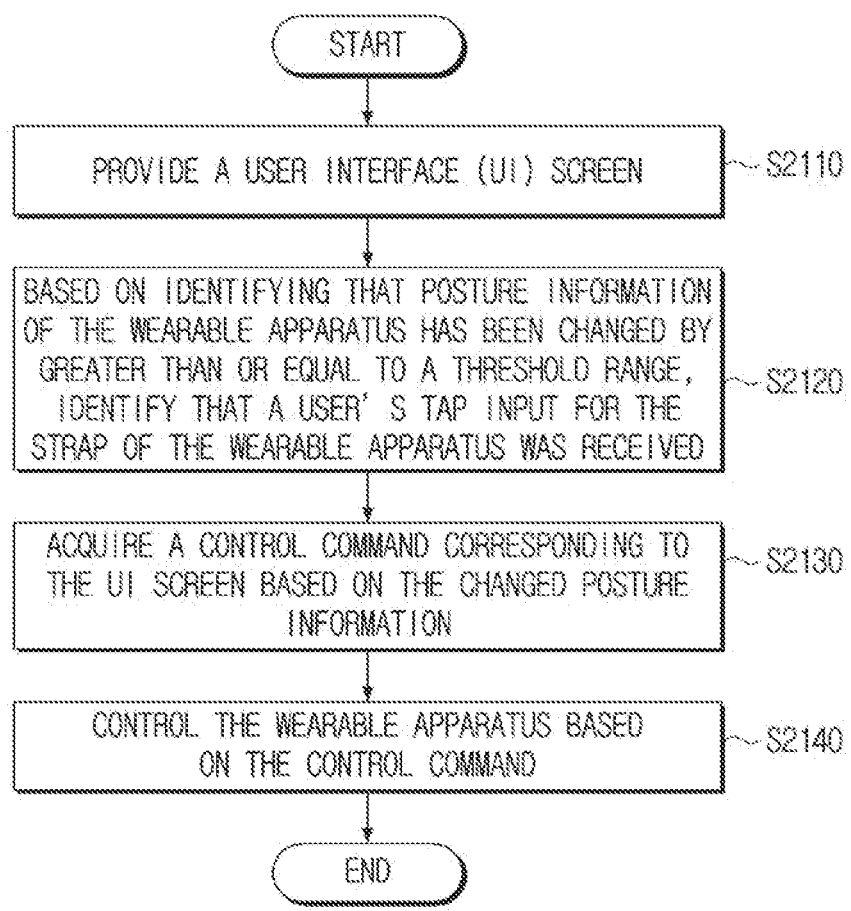
FIG. 21 is a flow chart for illustrating a control method of a wearable apparatus according to an embodiment.

FIG. 21 is a flow chart for illustrating a control method of a wearable apparatus according to an embodiment of the disclosure.

First, a user interface (UI) screen may be provided in operation S2110. Then, if it is identified that posture information of the wearable apparatus has been changed by greater than or equal to a threshold range, it is identified that a user's tap input for the strap of the wearable apparatus was received in operation S2120. Then, a control command corresponding to the UI screen may be acquired based on the changed posture information in operation S2130. Then, the wearable apparatus may be controlled based on the control command in operation S2140.

Also, the posture information may include angular velocity information, acceleration information, and magnetometer information, and in the operation of acquiring S2130, if first change information of the angular velocity information is greater than or equal to a first threshold value, second change information of the acceleration information is greater than or equal to a second threshold value, and third change information of the magnetometer information is greater than or equal to a third threshold value, the control command may be acquired based on the first change information, the second change information, and the third change information.

Here, in the operation of acquiring S2130, based on the angular velocity information during a first threshold time before the tap input is received being within a first threshold range, the acceleration information during the first threshold time being within a second threshold range, and the magnetometer information during the first threshold time being within a third threshold range, the control command may be acquired.

In embodiments, in the operation of acquiring S2130, if it is identified that the angular velocity information during a first threshold time is within a first threshold range, the acceleration information during the first threshold time is within a second threshold range, and the magnetometer information during the first threshold time is within a third threshold range, and during a second threshold time which is right after the first threshold time, the acceleration information increases from less than or equal to a first value to greater than or equal to a second value greater than the first value, and then becomes less than or equal to the first value, and the tap input was received within a third threshold time after the second threshold time, the control command may be acquired.

In embodiments, the posture information may include acceleration information, and in the operation of acquiring S2130, if the acceleration information increases from less than or equal to a first value to greater than or equal to a second value greater than the first value during a second threshold time which is before the tap input is received, and then becomes less than or equal to the first value, and second change information of the acceleration information according to the tap input is greater than or equal to a second threshold value, the control command may be acquired based on the acceleration information.

In embodiments, in the operation of acquiring S2130, if it is identified that the posture information has been changed by greater than or equal to the threshold range in a state wherein the wearable apparatus has been released from a lock state, the control command may be acquired based on the changed posture information.

Also, in the operation of acquiring S2130, in case there is no user manipulation through the display of the wearable apparatus while the tap input is received, the control command may be acquired based on the changed posture information.

In embodiments, in the operation of acquiring S2130, in case the wearable apparatus is worn on a user and a predetermined application has been executed, the control command may be acquired based on the changed posture information.

Also, in the operation of acquiring S2130, the changed posture information may be input into the neural network model and it may be identified whether the tap input is an input for controlling the wearable apparatus.

In embodiments, the control method may further include the operation of acquiring sound information by the tap input, and in the operation of acquiring S2130, the control command may be acquired based on at least one of the changed posture information or the sound information.

Here, the strap may be connected to the main body of the wearable apparatus.

According to the various embodiments of the disclosure as described above, if a tap input for the strap is received, the wearable apparatus may acquire a control command based on the changed posture information of the wearable apparatus according to the tap input, and thus the wearable apparatus can provide various manipulation methods to a user.

Also, the wearable apparatus may acquire the posture information of the wearable apparatus according to a tap input through a sensor previously provided, without adding a separate sensor, and thus there may be an advantage that the manufacturing cost does not increase.

In embodiments, according to an embodiment of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments (e.g.: an electronic apparatus A). In case an instruction is executed by a processor, the processor may perform a function corresponding to the instruction by itself, or using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, a method according to the aforementioned various embodiments may be provided while being included in a computer program product. The computer program product can be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as the server of the manufacturer, the server of the application store, and the memory of the relay server, or temporarily generated.

In addition, according to an embodiment of the disclosure, the aforementioned various embodiments may be implemented in a recording medium that can be read by a computer or an apparatus similar to a computer, using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

In embodiments, computer instructions for performing processing operations of an apparatus according to the aforementioned various embodiments may be stored in a non-transitory computer-readable medium. Computer instructions stored in such a non-transitory computer-readable medium make the processing operations at an apparatus according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Also, each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

Further, while preferred embodiments of the disclosure have been shown and described, embodiments are not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A wearable apparatus comprising:
a display;
a strap arranged adjacent to the display;
at least one sensor configured to acquire posture information of the wearable apparatus; and
at least one processor connected with the display and the at least one sensor and configured to control the wearable apparatus,
wherein the at least one processor is further configured to:
execute an application of the wearable apparatus,
based on identifying, while the application is executed, that a change in the posture information is greater than or equal to a threshold range, identify that a tap input of a user was received on the strap,
based on the changed posture information, acquire a control command corresponding to the application which is being executed, and
control the wearable apparatus based on the control command.

2. The wearable apparatus of claim 1, wherein the at least one sensor comprises:
a gyro sensor configured to obtain angular velocity information,
an acceleration sensor configured to obtain acceleration information, and
a magnetometer sensor configured to obtain magnetometer information, and
wherein the at least one processor further is configured to, based on first change information about the angular velocity information being greater than or equal to a first threshold value, second change information about the acceleration information being greater than or equal to a second threshold value, and third change information about the magnetometer information being greater than or equal to a third threshold value, acquire the control command based on the first change information, the second change information, and the third change information.

3. The wearable apparatus of claim 2, wherein the at least one processor is further configured to acquire the control command based on:
the angular velocity information during a first threshold time before the tap input is received being within a first threshold range,
the acceleration information during the first threshold time being within a second threshold range, and
the magnetometer information during the first threshold time being within a third threshold range.

4. The wearable apparatus of claim 2, wherein the at least one processor is further configured to acquire the control command based on identifying that:
the angular velocity information during a first threshold time is within a first threshold range,
the acceleration information during the first threshold time is within a second threshold range,
the magnetometer information during the first threshold time is within a third threshold range,
during a second threshold time after the first threshold time, the acceleration information increases from less than or equal to a first value to greater than or equal to a second value greater than the first value, and then becomes less than or equal to the first value, and
the tap input was received within a third threshold time after the second threshold time.

5. The wearable apparatus of claim 1, wherein the at least one sensor comprises an acceleration sensor configured to acquire acceleration information, and
wherein the at least one processor is further configured to, based on the acceleration information increasing from less than or equal to a first value to greater than or equal to a second value greater than the first value during a second threshold time before the tap input is received, and then becoming less than or equal to the first value, and second change information about the acceleration information corresponding to the tap input being greater than or equal to a second threshold value, acquire the control command based on the acceleration information.

6. The wearable apparatus of claim 1, wherein the at least one processor is further configured to, based on identifying that the posture information is changed by greater than or equal to the threshold range while the wearable apparatus is released from a lock state, acquire the control command based on the changed posture information.

7. The wearable apparatus of claim 1, wherein the at least one processor is further configured to, based on no user manipulation being detected at the display while the tap input is received, acquire the control command based on the changed posture information.

8. The wearable apparatus of claim 1, wherein the at least one processor is further configured to, based on the wearable apparatus being worn on the user, acquire the control command based on the changed posture information.

9. The wearable apparatus of claim 1, further comprising a memory configured to store a neural network model, and
wherein the at least one processor is further configured to input the changed posture information into the neural network model and identify whether the tap input is an input for controlling the wearable apparatus.

10. The wearable apparatus of claim 1, wherein the at least one sensor comprises a sound sensor, and
wherein the at least one processor is further configured to:
acquire sound information corresponding to the tap input through the sound sensor, and
acquire the control command based on at least one of the changed posture information and the sound information.

11. The wearable apparatus of claim 1, further comprising a main body,
wherein the display, the at least one sensor, and the at least one processor are included in the main body, and
wherein the strap is connected to the main body.

12. A control method of a wearable apparatus, the control method comprising:
executing an application of the wearable apparatus;
based on identifying, while the application is executed, that a change in posture information of the wearable apparatus is greater than or equal to a threshold range, identifying that a tap input of a user was received on a strap of the wearable apparatus;
based on the changed posture information, acquiring a control command corresponding to the application which is being executed; and
controlling the wearable apparatus based on the control command.

13. The control method of claim 12, wherein the posture information comprises angular velocity information, acceleration information, and magnetometer information, and wherein the acquiring comprises, based on first change information about the angular velocity information being greater than or equal to a first threshold value, second change information about the acceleration information being greater than or equal to a second threshold value, and third change information about the magnetometer information being greater than or equal to a third threshold value, acquiring the control command based on the first change information, the second change information, and the third change information.

14. The control method of claim 13, wherein the acquiring comprises, based on the angular velocity information during a first threshold time before the tap input is received being within a first threshold range, the acceleration information during the first threshold time being within a second threshold range, and the magnetometer information during the first threshold time being within a third threshold range, acquiring the control command.

15. The control method of claim 13, wherein the acquiring comprises acquiring the control command based on identifying that:

the angular velocity information during a first threshold time is within a first threshold range, the acceleration information during the first threshold time is within a second threshold range, the magnetometer information during the first threshold time is within a third threshold range, during a second threshold time which is right after the first threshold time, the acceleration information increases from less than or equal to a first value to greater than or equal to a second value greater than the first value, and then becomes less than or equal to the first value, and the tap input was received within a third threshold time after the second threshold time.

16. The control method of claim 12, wherein the posture information comprises acceleration information, and wherein the acquiring comprises, based on the acceleration information increasing from less than or equal to a first value to greater than or equal to a second value greater than the first value during a second threshold time before the tap input is received, and then becoming less than or equal to the first value, and second change information about the acceleration information corresponding to the tap input being greater than or equal to a second threshold value, acquiring the control command based on the acceleration information.

17. The control method of claim 12, wherein the acquiring comprises, based on identifying that the posture information is changed by greater than or equal to the threshold range while the wearable apparatus is released from a lock state, acquiring the control command based on the changed posture information.

18. The control method of claim 12, wherein the acquiring comprises:

based on no user manipulation being detected at a display of the wearable apparatus while the tap input is received, acquiring the control command based on the changed posture information.

19. The control method of claim 12, wherein the acquiring comprises:

based on the wearable apparatus being worn on the user, acquiring the control command based on the changed posture information.

20. The control method of claim 12, wherein the acquiring comprises:

inputting the changed posture information into a neural network model and identifying whether the tap input is an input for controlling the wearable apparatus.

* * * * *